(12) United States Patent
Jaaskelainen

(10) Patent No.: US 11,492,899 B2
(45) Date of Patent: Nov. 8, 2022

(54) METHODS AND SYSTEMS FOR CHARACTERIZING FRACTURES IN A SUBTERRANEAN FORMATION

(71) Applicant: Halliburton Energy Services, Inc., Houston, TX (US)

(72) Inventor: Mikko Jaaskelainen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 391 days.

(21) Appl. No.: 16/607,853

(22) PCT Filed: May 24, 2017

(86) PCT No.: PCT/US2017/034312
§ 371 (c)(1),
(2) Date: Oct. 24, 2019

(87) PCT Pub. No.: WO2018/217201
PCT Pub. Date: Nov. 29, 2018

(65) Prior Publication Data
US 2020/0190976 A1    Jun. 18, 2020

(51) Int. Cl.
*E21B 49/00* (2006.01)
*E21B 47/07* (2012.01)
(Continued)

(52) U.S. Cl.
CPC ............ *E21B 49/00* (2013.01); *E21B 43/263* (2013.01); *E21B 47/06* (2013.01); *E21B 47/07* (2020.05);
(Continued)

(58) Field of Classification Search
CPC ........ E21B 49/00; E21B 43/263; E21B 47/06; E21B 47/07; E21B 47/18; E21B 33/12;
(Continued)

(56) References Cited

U.S. PATENT DOCUMENTS

| 4,416,339 A | 11/1983 | Baker et al. |
| 5,009,273 A | 4/1991 | Grabinski |

(Continued)

FOREIGN PATENT DOCUMENTS

| EP | 1008717 A1 | 6/2000 |
| WO | 2016193733 A1 | 12/2016 |

(Continued)

OTHER PUBLICATIONS

International Search Report and Written Opinion dated Feb. 7, 2018 for PCT Application No. PCT/US2017/034312 filed May 24, 2017.

(Continued)

*Primary Examiner* — Brad Harcourt
(74) *Attorney, Agent, or Firm* — K&L Gates LLP

(57) ABSTRACT

Methods and systems for characterizing fractures in a subterranean formation are provided. The method includes introducing an encapsulated explosive unit into a casing located in a wellbore within the subterranean formation and maintaining the encapsulated explosive unit in a stage of the casing. The method also includes detonating the encapsulated explosive unit within the stage to generate a pressure wave that passes through a group of perforations and into the fractures and measuring a reflected pressure wave using a pressure sensor coupled to the bridge plug to produce a pressure measurement. The method further includes converting the pressure measurement into an acoustic signal correlated with the pressure measurement by an acoustic signal generator contained in the bridge plug and transmitting the acoustic signal to apply acoustic pressure on a fiber optic cable coupled to an exterior surface of the casing.

28 Claims, 13 Drawing Sheets

(51) Int. Cl.
*E21B 43/263* (2006.01)
*E21B 47/06* (2012.01)
*E21B 47/18* (2012.01)
*G01K 3/14* (2006.01)
*G01K 11/32* (2021.01)
*G01V 1/104* (2006.01)
*G01V 1/143* (2006.01)
*G01V 1/16* (2006.01)
*G01V 1/22* (2006.01)
*G01V 1/46* (2006.01)
*E21B 33/12* (2006.01)

(52) U.S. Cl.
CPC .............. *E21B 47/18* (2013.01); *G01K 3/14* (2013.01); *G01K 11/32* (2013.01); *G01V 1/104* (2013.01); *G01V 1/143* (2013.01); *G01V 1/162* (2013.01); *G01V 1/226* (2013.01); *G01V 1/46* (2013.01); *E21B 33/12* (2013.01); *G01V 2210/121* (2013.01); *G01V 2210/1299* (2013.01); *G01V 2210/646* (2013.01)

(58) Field of Classification Search
CPC ........... E21B 43/26; E21B 47/01; G01K 3/14; G01K 11/32; G01V 1/104; G01V 1/143; G01V 1/162; G01V 1/226; G01V 1/46; G01V 2210/121; G01V 2210/1299; G01V 2210/646; G01V 2210/1234; G01H 9/004
See application file for complete search history.

(56) References Cited

U.S. PATENT DOCUMENTS

| | | | |
|---|---|---|---|
| 5,170,378 A * | 12/1992 | Mellor | ................ E21B 49/008 73/152.58 |
| 5,467,834 A | 11/1995 | Hughes et al. | |
| 6,723,687 B2 | 4/2004 | Clare | |
| 7,134,492 B2 | 11/2006 | Willberg et al. | |
| 8,939,205 B2 | 1/2015 | Ersoz | |
| 9,255,471 B2 | 2/2016 | Andrzejak et al. | |
| 9,334,719 B2 | 5/2016 | Rytlewski et al. | |
| 9,488,043 B2 | 11/2016 | Ersoz et al. | |
| 9,500,069 B2 | 11/2016 | Busby et al. | |
| 9,528,338 B2 | 12/2016 | Hall | |
| 2002/0157828 A1 | 10/2002 | King et al. | |
| 2006/0102342 A1 | 5/2006 | East et al. | |
| 2011/0272147 A1 | 11/2011 | Beasley et al. | |
| 2012/0037368 A1 | 2/2012 | Eick et al. | |
| 2013/0292112 A1 | 11/2013 | Davis | |
| 2014/0158356 A1 | 6/2014 | Andrzejak et al. | |
| 2015/0021023 A1 | 1/2015 | Roberts et al. | |
| 2015/0354337 A1 | 12/2015 | Ersoz et al. | |
| 2016/0053164 A1 | 2/2016 | Gupta et al. | |
| 2016/0123126 A1 | 5/2016 | Portman | |
| 2016/0146963 A1 | 5/2016 | Hall et al. | |
| 2016/0160642 A1 | 6/2016 | Hall et al. | |
| 2017/0045633 A1 * | 2/2017 | Moncho | ................ G01V 1/157 |
| 2017/0138169 A1 * | 5/2017 | Bogdan | ................ E21B 33/12 |
| 2018/0128090 A1 * | 5/2018 | Friesen | ................ E21B 43/26 |
| 2018/0245448 A1 * | 8/2018 | Fripp | ................ E21B 47/06 |
| 2018/0252091 A1 * | 9/2018 | Bustos | ................ E21B 47/01 |
| 2018/0320503 A1 * | 11/2018 | Smith | ................ E21B 33/134 |

FOREIGN PATENT DOCUMENTS

| | | |
|---|---|---|
| WO | 2017065724 A1 | 4/2017 |
| WO | 2017099717 A1 | 6/2017 |
| WO | 2017105433 A1 | 6/2017 |
| WO | 2017078699 A1 | 11/2017 |

OTHER PUBLICATIONS

Ramurthy, Muthukumarappan, et al., "Fiber-Optics Results From an Intra-Stage Diversion Design Completions Study in the Niobrara Formation of DJ Basin", SPE-179106-MS, Feb. 2016, 16 pgs.

Parrish, R.L., et al., "A True In-Situ Fracturing Experiment Final Results", SPE-7513-PA, Apr. 6, 1979, 8 pgs.

Warpinski, N.R., et al., "Autonomous Microexplosives Subsurface Tracing System Final Report", SAND2004-1415, Apr. 2004, 70 pgs.

LDRD-2000, SNL, "Science and Technology Mission Technologies Grand Challenges", Department of Energy National Laboratory, Mar. 2001, SAND 2001-1126, 683 pgs.

LDRD-2001, SNL, "Science and Technology Mission Technologies Grand Challenges", Department of Energy National Laboratory, Mar. 2002, SAND 2002-0812, 871 pgs.

LDRD-2002, SNL, "Science and Technology Mission Technologies Grand Challenges", Department of Energy National Laboratory, Mar. 2003, SAND 2003-0941, 942 pgs.

* cited by examiner

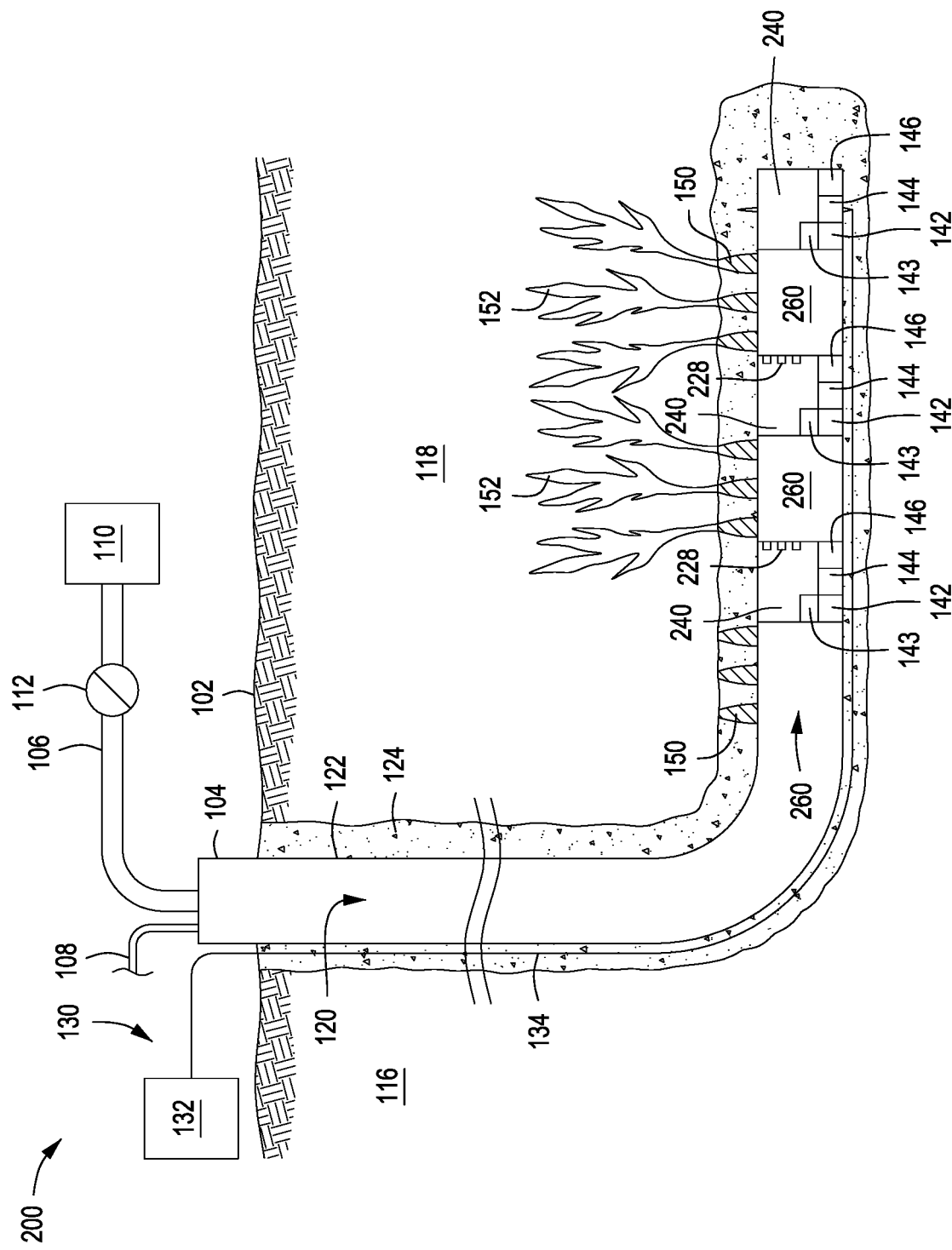

METHODS AND SYSTEMS FOR CHARACTERIZING FRACTURES IN A SUBTERRANEAN FORMATION

BACKGROUND

This section is intended to provide relevant background information to facilitate a better understanding of the various aspects of the described embodiments. Accordingly, it should be understood that these statements are to be read in this light and not as admissions of prior art.

Monitoring physical conditions inside a borehole of oil, gas, and other subterranean wells is important in order to ensure proper drilling and/or completion operations of the well. However, it can be difficult for operators to perform accurate bottom hole measurements. For example, bottom hole pressure data calculated from surface pressure can be inaccurate for many applications.

In some operations, a source mechanism includes a manipulation of surface events to generate a pressure event that is sent downhole. For example, the use of pumps at the surface can increase the rate that the fluid is injected or flowed into the borehole to generate a relatively weak pressure event that travels through the borehole before reaching the fractures in the formation. The velocity in the fluid is known so the time from an initial pressure event to the return of the reflected pressure wave can be used to determine each fracture length. However, pressure events generated at the surface tend to be subject to signal attenuation/dispersion effects and the rising edge may be less sharp than desired for accurate fracture length measurements. The returned pressure signatures may be relatively small in amplitude and these signals may then be further impacted by attenuation/dispersion effects during travel to the surface. Pumps at the surface may add additional noise sources so the accurate detection of small magnitude events and/or multiple events may be limited or impossible as signals overlap and interfere with one another.

Therefore, there is a need for systems and methods that provide relatively sharp pressure events at the perforation and fractures in a subterranean formation and also the ability to measure reflected pressure events with great accuracy and minimum signal dispersion, attenuation, and signal degradation.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

FIG. 2 is a schematic view of another system for characterizing fractures in a subterranean formation, according to one or more embodiments;

DETAILED DESCRIPTION

Figure 1A:
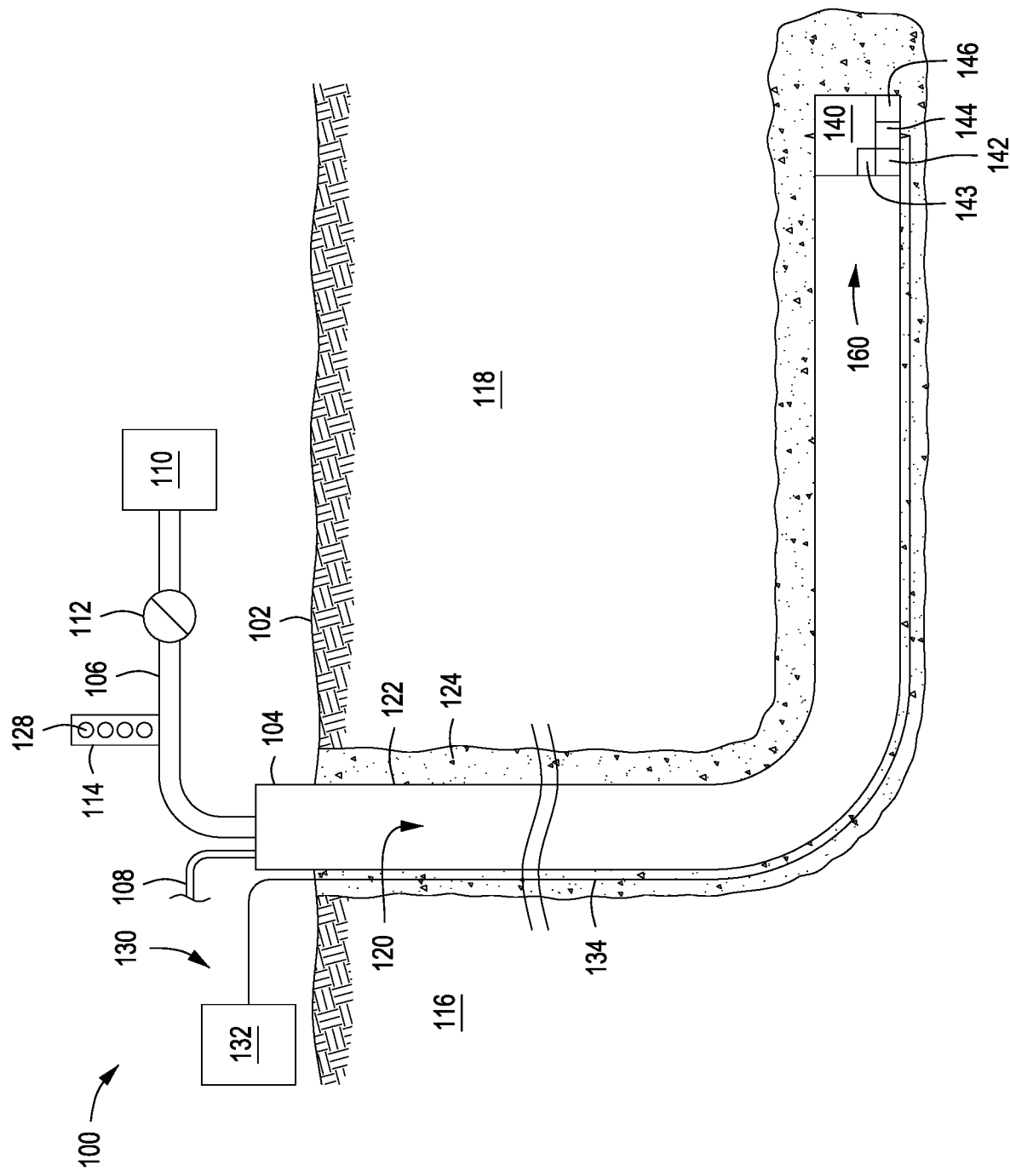
FIGS. 1A-1I are schematic views of a system at different stages of characterizing fractures in a subterranean formation, according to one or more embodiments.

Embodiments described and discussed herein include systems and methods that provide real-time characterization of fracture length, fracture complexity, and/or fracture connectivity on demand during and/or after a fracturing operation within a wellbore. An energy source (e.g., explosive or fluid hammer) is used to generate a downhole pressure wave or event and downhole pressure sensors in communication with the surface are used to make real-time downhole pressure measurements. The pressure is measured as a function of time after a sharp downhole pressure change so that fracture length and fracture complexity can be derived from the measured pressure response. Propped fracture length and propped fracture complexity can also be determined once the wellbore environment reaches reservoir pressure.

FIGS. 1A-1I are schematic views of a downhole system 100 at progressively different stages of a method for characterizing fractures 152 in a subterranean formation 118. It should be noted that while FIGS. 1A-1I generally depict a land-based system, it is to be recognized that the system 100 can be operated in subsea locations as well. Also, even though FIGS. 1A-1I depict the wellbore 120 in horizontal and vertical positions and the bridge plugs 140 and stages 160 located in a horizontal proportion of the wellbore 120, it should be understood that the systems and methods are equally well-suited for use in any portion of wellbores having horizontal, vertical, slanted, or multilateral positions.

FIG. 1A illustrates the system 100 containing one or more wellbores 120 extending through earth strata 116 and into the subterranean formation 118 according to one or more embodiments. The wellbore 120 includes a casing 122 positioned or otherwise contained therein. The casing 122 can extend the length of the wellbore 120 and can be cemented in place within the wellbore 120 by a cemented annular 124. The cemented annular 124 is located between the casing 122 and the earth strata 116 and the subterranean formation 118. Tubulars, not shown, includes coiled tubing or production tubing string and can be positioned in the casing 122. The wellbore 120 is shown traversing the earth strata 116 and into the subterranean formation 118 (e.g., potentially traversing various formation layers and thousands of feet) before reaching one or more production regions of the subterranean formation 118. High pressure fracturing applications are applied through the casing 122 and directed at production regions of the subterranean formation 118.

A wellhead 104 at or on the ground surface 102 includes lines 106, 108 coupled thereto for hydraulic access to the wellbore 120. More specifically, a high pressure line 106 is depicted along with a production line 108. The high pressure line 106 is coupled to a mixing tank or container 110, in which fluid compositions can be formulated before introduction into the wellbore 120. One or more pumps 112 are configured to raise the pressure of fluid compositions to a desired value before the fluid composition is introduction into the wellbore 120. For example, the pump 112 can generate about 5,000 psi or greater during fracturing applications.

Figure 1B:
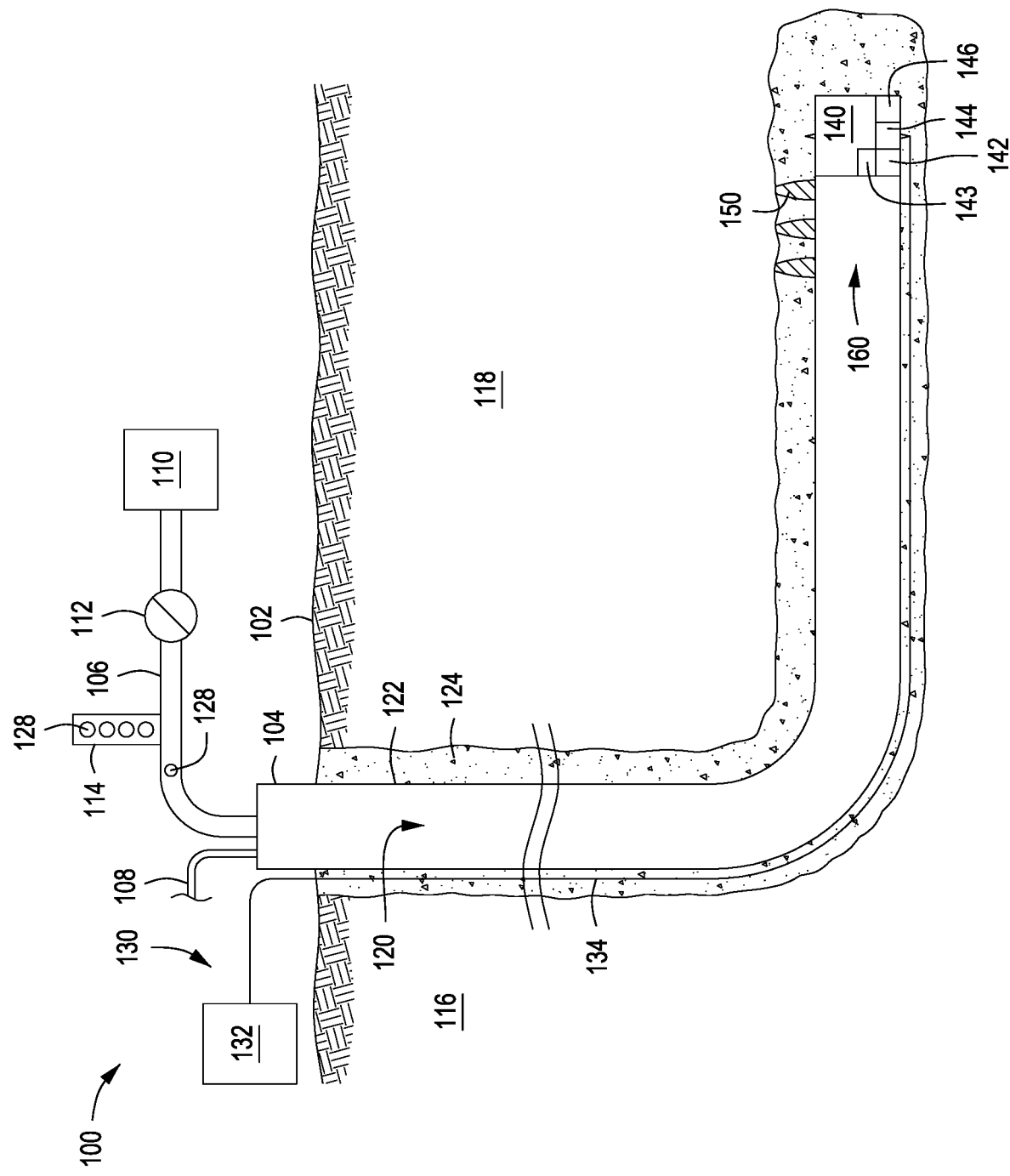

The system 100 includes one or more bridge plugs 140 disposed in the wellbore 120. The bridge plugs 140 isolate portions or segments of the casing 122 or the wellbore 120 to produce stages 160. FIGS. 1A-1E depict one bridge plug 140 and one stage 160 adjacent uphole to the bridge plug 140 within the casing 122. Two bridge plugs 140 and two stages 160 within the casing 122 are depicted in FIGS. 1F and 1G, and three bridge plugs 140 and three stages 160 within the casing 122 are depicted in FIGS. 1H and 1I. As the downhole system 100 is depicted at progressively different stages of the method for characterizing fractures 152, additional bridge plugs 140 and stages 160 are added in the casing 122, although not shown in the Figures. The wellbore 120 typically includes a plurality of bridge plugs 140 and stages 160 downhole in the casing 122. For example, the wellbore 120 can include from about 4, about 5, about 10, about 15, about 20, about 30, or about 40 to about 50, about 60, about 70, about 80, about 100, or more bridge plugs 140 forming the same amount of stages 160 within the casing 122. For example, the wellbore 120 can include about 5 to about 80, about 10 to about 70, about 20 to about 60, about 40 to about 50 bridge plugs 140 forming the same amount of stages 160 within the casing 122.

In some embodiments, the bridge plugs 140 are dropped by wireline down a vertical portion of the wellbore 120. Upon reaching the lateral portion of the wellbore 120, hydraulic pressure is employed to push bridge plugs 140 into position before wireline actuating the bridge plugs 140 for setting the plugs. In other embodiments, slickline, jointed pipe, or coiled tubing can be used to deploy bridge plugs. In such embodiments, bridge plug setting can be hydraulically actuated or through the use of a separate setting tool. As the bridge plugs 140 are positioned in the wellbore 120, the stages 160 may be formed in any portion of the wellbore 120 and can be positioned in lateral, horizontal, and/or angled leg portions of the wellbore 120.

When deployed, the bridge plugs 140 isolate downhole sections (e.g., including cased and uncased portions) of the lateral portion of the wellbore 120. For example, with the bridge plugs 140 deployed as illustrated in FIGS. 1B-1I, fracturing operations can be focused at the area of the wellbore 120 uphole of the bridge plug 140. FIGS. 1B-1I depict perforations 150 that penetrate the casing 122 and the cemented annular 124 and extend toward and/or into the subterranean formation 118. The perforations 150 can be formed by conventional perforation applications. Thus, localization of high pressure pumping of the fracturing fluids into the perforations 150 (FIG. 1B) at production regions of the subterranean formation 118 can be achieved. As noted above, subsequent recovery of fracturing fluids (or hydrocarbons from production) is achieved through production line 108, once one or more bridge plugs 140 are removed from the wellbore 120.

Each of the bridge plugs 140 includes one or more pressure sensors 142, processing circuitry 144, and one or more transducers or acoustic signal generators 146. The pressure sensor 142 detects a pressure measurement within the adjacent uphole stage 160. The processing circuitry 144 and the acoustic signal generator 146 convert the pressure measurement into an acoustic signal correlated with the pressure measurement. The acoustic signal is transmitted to a fiber optic cable 134 of a fiber optic sensing system 130 coupled to the exterior surface of the casing 122, as further described and discussed below.

The bridge plug 140 can also include one or more additional sensors 143 besides the pressure sensor 142. In one or more embodiments, each of the bridge plugs 140 include the secondary sensor 143 that can be in operable communication with the processing circuitry 144 and the transducer or acoustic signal generator 146, or in operable communication with a secondary processing circuitry and a secondary transducer or signal generator (not shown). In some examples, the secondary sensor 143 can be or include, but is not limited to, one or more temperature sensors, acoustic sensors, vibration and/or seismic sensors (e.g., accelerometer or geophone), or any combination thereof. The processing circuitry 144 and the signal generator 146 can convert the one or more measurements from the secondary sensor 143 into a signal correlated with the measurement and the signal is transmitted to the fiber optic cable 134.

In one or more embodiments, the secondary sensor 143 is a seismic sensor coupled to the bridge plug 140. The seismic sensor detects, records, or otherwise measures one or more seismic signals generated from detonating the encapsulated explosive unit, detonating one or more other explosive devices, performing a fracturing operation, operating one or more vibrator units (e.g., seismic vibrator truck or vibrator ground unit), or combinations thereof. The seismic signals can be generated before, during, and/or after the fracturing operation. The seismic signals can be micro-seismic events due to the fracturing of the subterranean formations 118 or other vibrations produce by the fracturing operation.

The bridge plug 140 is positioned within the casing 122 using methods that can require a significant force or impulse, such as an explosive charge, to couple the bridge plug 140 within the casing 122. Alternatively, setting of the bridge plug 140 is actuated hydraulically or through the use of a separate setting tool which radially expands the bridge plug into position. Slips (not shown) may be provided on the bridge plug 140 to assist in holding the bridge plug 140 in place within the wellbore 120 or the casing 122. For example, teeth in the slips component of the bridge plug 140 can be actuated to dig into the casing 122, thereby anchoring the bridge plug 140 in place. The slips help keep the bridge plug 140 immobilized in spite of differential pressure potentially exceeding 5,000 psi during perforating or fracturing applications.

The bridge plug 140 is either drillable or retrievable. Drillable bridge plugs are typically constructed of a brittle metal (e.g., iron or steel) that is drilled out once use of the plug is over. An alternative to drillable bridge plugs are various configurations of retrievable bridge plugs, which can be used to temporarily isolate portions of the wellbore 120 before being removed, intact, from the wellbore 120. Retrievable bridge plugs typically have anchor and sealing elements (not shown) that engage and secure it to the interior wall of the casing 122. To retrieve the bridge plug 140, a retrieving tool (not shown) is lowered into the casing 122 to engage a retrieving latch, which, through a retrieving mechanism, retracts the anchor and sealing elements, allowing the bridge plug 140 to be pulled out of the wellbore 120.

Completion and stimulation for horizontal wells, for example, often includes dividing the horizontal wellbore length into a number of planned intervals, or stages 160, designated for fracture treatment. To promote fracture growth from multiple starting points, stages are typically designed with two to eight clusters or groups of perforations 150 distributed uniformly along the stage length.

One example of a completion technique, such as a plug and perforation completion, is a flexible multi-stage well completion technique for cased hole wells where each stage 160 can be perforated and treated independently. Knowledge from each previous stage 160 or further downhole stage) can be applied to optimize treatment of the current stage 160 (or uphole stage). When performing multi-stage treatments, a bridge plug 140 is positioned after each stage 160 to isolate the previous stage 160. Perforation guns are fired to form clusters or groups of perforations 150 before fracturing operations are performed (See FIGS. 1B, 1F, and 1H). After each stage 160 is completed, the next bridge plug 140 is set, and perforations 150 are initiated, and the process is repeated moving further uphole (e.g., up the wellbore 120).

The fiber optic sensing system 130 contains an interrogator unit 132 connected to one or more fiber optic cables 134. The interrogator unit 132 may be located at the ground surface 102 of the wellbore 120. The fiber optic cable 134 can be positioned along the exterior of the casing 122. The fiber optic cable 134 can be located and extends outside the casing 122 and clamped before being cemented into position. It is important not to perforate fibers when creating clusters or groups of perforations 150 (FIG. 1B). The clamps (not shown) holding the fiber optic cable 134 in place usually have a certain amount of metal mass that can be detected using electro-magnetic unit or a current detector to prevent accidental perforation of the fiber optic cable 134.

The fiber optic cable 134 can include any combination of lines (e.g., optical, electrical, and hydraulic lines) and reinforcements. Multiple fibers within one fiber optic cable 134 can offer redundancy and/or the ability to interrogate with different instrumentation simultaneously. The fiber optic cable 134 is primarily sensitive along its axis, making it analogous to a single continuous component geophone oriented along the wellbore 120 (which itself could be deviated and changing orientation) that allows for the recording of acoustic records. At low frequencies, the fiber optic cable 134 can be sensitive to temperature variation as well as acoustic sources.

The fiber optic sensing system 130 can be or include, but is not limited to, fiber optics-based distributed systems such as distributed temperature sensing (DTS), distributed acoustic sensing (DAS), and other sensing systems based on, for example, interferometric sensing. The fiber optic sensing system 130 utilizes electro acoustic technology ("EAT") sensors and sensing technology and is in operable communication with the pressure sensors 142, the secondary sensors 143, the processing circuitry 144, and the transducers or acoustic signal generators 146. The EAT sensors (e.g., the pressure sensors 142 and the secondary sensors 143) can be used in fiber optic sensing in which any number of downhole sensors, electronic or fiber optic based, can be utilized to make the basic parameter measurements, but all of the resulting information is converted at the measurement location into perturbations or a strain applied to the fiber optic cable 134 that is connected to the interrogator unit 132. The interrogator unit 132 may routinely fire optical signal pulses downhole into the fiber optic cable 134. As the pulses travel down the fiber optical cable back scattered light is generated and is received by the interrogator. The perturbations or strains introduced to the fiber optical cable 134 at the location of the various EAT sensors (e.g., the pressure sensors 142 and the secondary sensors 143) can alter the back propagation of light and those effected light propagations can then provide data with respect to the signal that generated the perturbations.

The fiber optic sensing system 130 can be or include the EAT system and can contains surface components to send signals induced into the fiber optic cable 134 by a downhole sensor system. The interrogator unit 132 can be or include an EAT receiver coupled to one or more fiber optic cables 134 which extend, in this described configuration, exterior to the casing 122 within the wellbore 120. Light signals propagating in the fiber optic cable 134 and is analyzed to extract the signal from the fiber optical. In one embodiment, the interrogator unit 132 is used to extract the signal from the fiber optical. The fiber optic cable 134 can be part of a DAS fiber system where coherent Rayleigh scattering is used to detect the acoustic signal or can be implemented through other forms of interferometer based on, for example, Michelson, Mach-Zehnder, Fabry-Perot, and/or other principles.

The interrogator unit 132 can be structured, for example, to inject a laser pulse into the fiber optic cable 134. As the pulse travels down the fiber optic cable 134, Rayleigh back scattered light is generated by impurities within the silica lattice structure of the fiber optic cable 134. The backscattered light from the pulses will interfere with each other, generating a signal amplitude that is dependent on the amount of strain on the fiber optic cable 134. It is noted that the strain on the fiber optic cable 134 depends on the perturbation of the fiber optic cable 134 by the transducer. The signal is effectively a representation of the instantaneous strain on fiber optic cable 134, which can be generated by acoustic signals (vibrational impulses) acting upon the fiber optic cable 134.

In a system implemented to use Rayleigh scattering, the Rayleigh back-scattered light is collected at the surface using the interrogator unit 132 and recombined with the input signal to determine an amplitude and phase associated with the depth from which the signal came. In this way, a value of the measured pressure is extracted by receiving the optical signal resulting from the perturbation of the fiber optic cable 134. In the course of fracturing operations, fracturing fluids, primarily composed of water, as well as other additives, including gelling agents, breakers, proppant, and other fluid treatment agents, can be pumped downhole for stimulating hydrocarbon production from one or more subterranean formations 118. Generally, the fluids are conveyed via high pressure line 106 to wellhead 104, where the fluid composition enters the wellbore 120. Fluid compositions subsequently penetrate into one or more subterranean formations 118. The production line 108 is provided for recovery of hydrocarbons following completion of the wellbore 120. However, the production line 108 can also be utilized in recovering fracturing fluids, such as that pumped downhole via high pressure line 106. In some embodiments, at least a portion of the fracturing fluids flow back to wellhead 104 and exit the subterranean formation 118. The fracturing fluids that have flowed back to wellhead 104 can subsequently be recovered (e.g., via production line 108), and in some examples reformulated, and recirculated back to the subterranean formation 118.

Seismic sensing provided by the vibration and/or seismic sensor 142 can be or include single axis (x) data, dual axis (x, y) data, tri-axis (x, y, z) data, or any combination thereof, whereas the z-axis data is axial with the axis of the wellbore 120. In some examples, the vibration and/or seismic sensor 142 can provide single or dual data and can be used for micro-seismic monitoring. The data can be used for micro-seismic monitoring and/or the data can be used in a combination of micro-seismic monitoring and DAS system. In a DAS system, the wave field travel direction augments the measured DAS data as DAS systems can detect the waves but not the directionality. The wave field directionality provides three-dimension location definition (e.g., x, y, and z axis) of micro-seismic events detected with DAS systems.

The DAS system measures the propagation and move-out of the seismic signal with a data point every sample point. The DAS system can have a sampling resolution of about 1 meter. Micro-seismic and/or seismic sensors are point sensors that can have a sensor count of about 20 sensors to about 80 sensors per well for downhole operations and with a spatial separation of about 25 m to about 100 m. The DAS system does not have to be moved during a survey to get sufficient coverage unlike traditional downhole seismic sensing arrays. The seismic sensors could be combined with surface seismic sources for three-dimensional seismic monitoring before, during, and/or after frac stages.

The system 100 includes one or more explosive unit distributers 114 coupled to and in fluid communication with the wellbore 120. The explosive unit distributer 114 is coupled to the high pressure line 106, as depicted in FIG. 1A. Alternatively, although not shown, the explosive unit distributer 114 is directly coupled to the wellbore 120 and/or another line. The explosive unit distributer 114 contains one or more explosive units 128 (e.g., encapsulated explosive units) and is used to inject or otherwise introduce the explosive units 128 into the casing 122. Typically, the explosive unit distributer 114 contains a plurality of the explosive units 128, but can inject or otherwise introduce the explosive units 128 one, two, or more at a time and at any rate. Typically, the methods include introducing an encapsulated explosive unit one at a time. The explosive unit distributer 114 can contain from 2, 3, about 5, or about 10 explosive units 128 to about 15, about 20, about 50, about 75, about 100, or more explosive units 128.

The explosive unit 128 is delivered to and maintained in the stage 160 of the casing 122. The size of the explosive unit 128 is typically larger than the perforations 150 in the stage 160, that is, the explosive unit 128 has lengths in all dimensions that are longer than the diameter of the perforations 150 so not to allow passage of the explosive unit 128 through the perforations 150. In some examples, the explosive unit 128 is spherical or substantially spherical with a larger diameter than the diameter of the perforations 150. The fluid can carry the explosive unit 128 through the high pressure line 106 and the wellbore 120 to the stage 160, but once in the stage 160, the fluid can pass on through the perforations 150 and into the fractures 152 while the explosive unit 128 stays in the stage 160.

The explosive unit 128 (e.g., encapsulated explosive unit) can have a diameter of greater than 0.5 inches, such as about 0.8 inches, about 1 inch, about 1.5 inches, about 2 inches, or about 2.5 inches to about 3 inches, about 3.5 inches, about 4 inches, about 4.5 inches, about 5 inches, about 6 inches, or greater. For example, the explosive unit 128 can have a diameter of about 0.8 inches to about 5 inches, about 1 inch to about 5 inches, about 1 inch to about 3 inches, about 1.5 inches to about 3 inches, or about 2 inches to about 4 inches.

In one or more embodiments, the explosive unit 128 is an encapsulated explosive unit that contains one or more explosive or highly energetic materials at least partially encapsulated, coated, or surrounded by one or more coatings. The explosive or highly energetic material in the encapsulated explosive unit can produce acoustic waves by strong reactions resulting in deflagration (relatively slower) or explosion (relatively faster). The explosive or highly energetic materials can be or include one or more primary explosive/energetic materials and/or one or more secondary explosive/energetic materials. In some embodiments, the explosive or highly energetic materials can include one or more water sensitive elements or reagents. Exemplary water sensitive elements or reagents can be or include, but are not limited to, lithium, sodium, potassium, cesium, magnesium, aluminum, alloys thereof, or any combination thereof. Other water sensitive elements or reagents can be or include one or more inorganic compounds or binary mixtures, such as potassium azidodisulfate ($KN_3O_6S_2$), bismuth nitride (BiN), magnesium and silver nitrate ($AgNO_3$+Mg), magnesium and ceric ammonium nitrate ($Mg+(NH_4)_2Ce(NO_3)_6$), magnesium and iodopentoxide ($Mg+I_2O_5$), magnesium and barium peroxide ($Mg+BaO_2$), magnesium and iodine ($Mg+I_2$), aluminum and iodine ($Al+I_2$), zinc and iodine ($Zn+I_2$), boron and silver difluoride ($B+AgF_2$), salts thereof, alloys thereof, or any combination thereof. These explosive or highly energetic materials in the encapsulated explosive unit participate in exothermic reactions that lead to explosions in contact with water. When encapsulated or otherwise coated in a protective coating, these explosive or highly energetic materials may produce acoustic signals or use the generated heat of reaction to boost other sensitive materials to produce acoustic signals. These secondary explosive or highly energetic materials can be or include, but are not limited to, one or more azides (e.g., lead azide, silver azide, and/or sodium azide), lead styphanate, DBX-1, PETN, RDX, HMX, salts thereof, derivatives thereof, or any combination thereof.

In one or more embodiments, the encapsulated explosive unit can be at least partially encapsulated, coated, or surrounded by one or more coatings. The coating, film, encapsulation, or packaging contained on the explosive or highly energetic material can be a protective coating and can include one or more materials. For example, the encapsulated explosive unit can include one or more polymeric coatings containing one or more natural polymers, one or more synthetic polymers, or any combination thereof. The coating can include one or more biomaterials such as cellulose, cellulose acetate, cellulose acetate butyrate, sucrose, derivatives thereof, or any combination thereof one or more vinyl polymers such as polystyrene (PS), polyvinyl alcohol (PVA), polyacrylamide (PA), acrylic acid, methyl methacrylate, polyvinyl chloride (PVC), polyvinylidene chloride (PVDC), polyvinylidene fluoride (PVDF), polylactic acid (PLA), polyglycolic acid (PGA), copolymers thereof, derivatives thereof, or any combination thereof. In some example, the coating can be or include one or more polymer films such as those found in pharmaceutical packaging (e.g., blister packs). Such coating can be applied as conformal spray coated or as a roll-to-roll film to form blister packs or other pocket geometries.

The coating can be selectively permeable to and/or dissolves or deteriorates in water, brine, acids, or alkali, or hydrocarbon liquid phases. In some embodiments, detonation could be initiated by water ingress to a water-sensitive mixture, increase in temperature or pressure, a change in pH of the fluid or surrounding environment, anisotropic (crushing) forces within fractures or by tool deployment, or by wireline tool action such as gamma irradiation or other electromagnetic radiation, or by mechanical shock from acoustic sources.

The downhole system 100 is depicted in FIGS. 1A-1I at progressively different phases of preparing several stages 160 and characterizing fractures 152 in the subterranean formation 118 at each stage 160.

FIG. 1A depicts the system 100 containing a first bridge plug 140 contained in the wellbore 120 prior to perforating the casing 122 and the cemented annular 124.

FIG. 1B depicts a first group of perforations 150 formed and passing through the casing 122 and the cemented annular 124. Also depicted, one explosive unit 128 (e.g., encapsulated explosive unit) has been injected or otherwise introduced into the casing 122 from the explosive unit distributer 114. Fracture initiation points of the subterranean formation 118 adjacent the first stage 160 can be determined by DTS via the fiber optic sensing system 130. Although the explosive unit 128 is depicted in the casing, fracture initiation points of the subterranean formation 118 can be determined prior to, during, and/or subsequent to the introduction of the explosive unit 128 into the casing 122. Also, fluid allocations for the subterranean formation 118 adjacent the first stage 160 can be determined by DAS via the fiber optic sensing system 130.

Figure 1C:
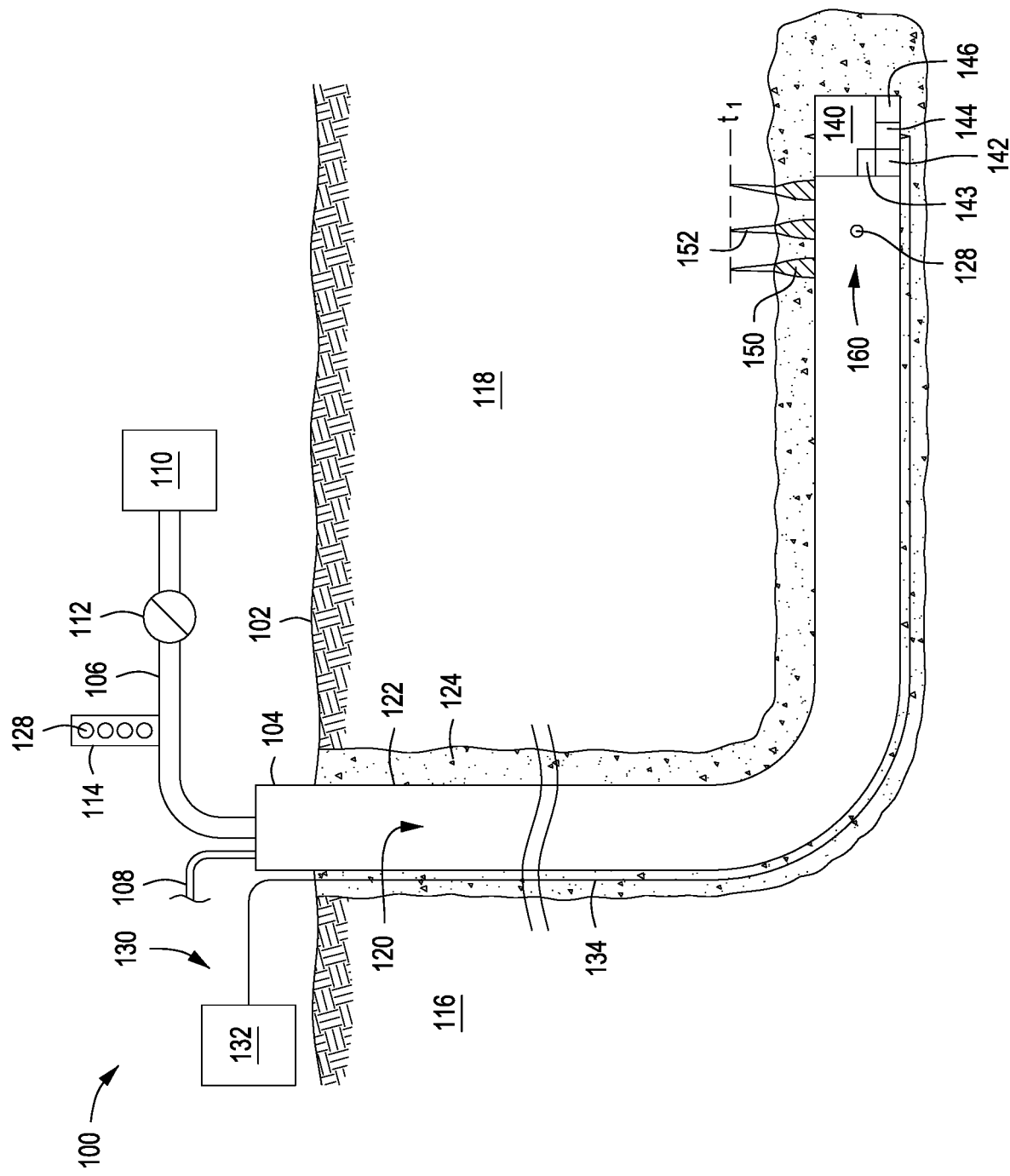

FIG. 1C depicts a plurality of fractures 152 produced by fracturing the subterranean formation 118 with hydrostatic pressure formed by the pump 112 located above the ground surface 102. The fractures 152 can extend from the perforations 150 into the subterranean formation 118. The characterization of the lengths and complexity of the fractures 152 at a predetermined time $t_1$ (as noted in FIG. 1C) is determined.

Still viewing FIG. 1C, the explosive unit 128 is depicted maintained or kept in the first stage 160 of the casing 122, adjacent and uphole of the first bridge plug 140, and in front of the first group of perforations 150 formed through the casing 122. The explosive unit 128 can be maintained in the first stage 160 prior to, during, and/or after the fracturing operation. The explosive unit 128 can be maintained in the first stage 160 because the explosive unit 128 has a size too large to allow the explosive unit 128 passage through the perforations 150 in the first stage 160.

At the desired time, the explosive unit 128 is activated to explode or detonate within the first stage 160 to generate a pressure wave. The explosive unit 128 can be activated or excited by one or more chemical processes and/or by one or more forces, such as a pressure force and/or an electromagnetic force.

In one or more examples, the explosive unit 128 can be detonated within the first stage 160 by dissolving or degrading the protective coating from one or more explosive or highly energetic materials contained within the explosive unit 128. In some embodiments, one or more chemical agents can be injected or introduced into the first stage 160 to dissolve or degrade the protective coating from the explosive or highly energetic material. The chemical agent can be or include, but is not limited to one or more solvents, one or more reagents, or a combination thereof. In other examples, the protective coating can be dissolved or degraded from the explosive or highly energetic material by controlling the temperature of the fluid, the pH of the fluid, the concentration of one or more chemical agents or solvents within the fluid, or any combination thereof. The explosive or highly energetic materials can be detonated upon being exposed to water or other compounds contained in the fluid.

The generated pressure wave passes through the first group of perforations 150 and further passes into the fractures 152 contained in the subterranean formation 118 at time $t_1$. The pressure wave is reflected from within the fractures 152. The reflected pressure wave provides a change of pressure that is measured or otherwise detected with the pressure sensor 142 contained in the first bridge plug 140. The pressure measurement is converted into an acoustic signal correlated with the pressure measurement by the processing circuitry 144 and the transducer or acoustic signal generator 146 contained in the first bridge plug 140. The acoustic signal is transmitted to apply acoustic pressure on the fiber optic sensing system 130.

Figure 1D:
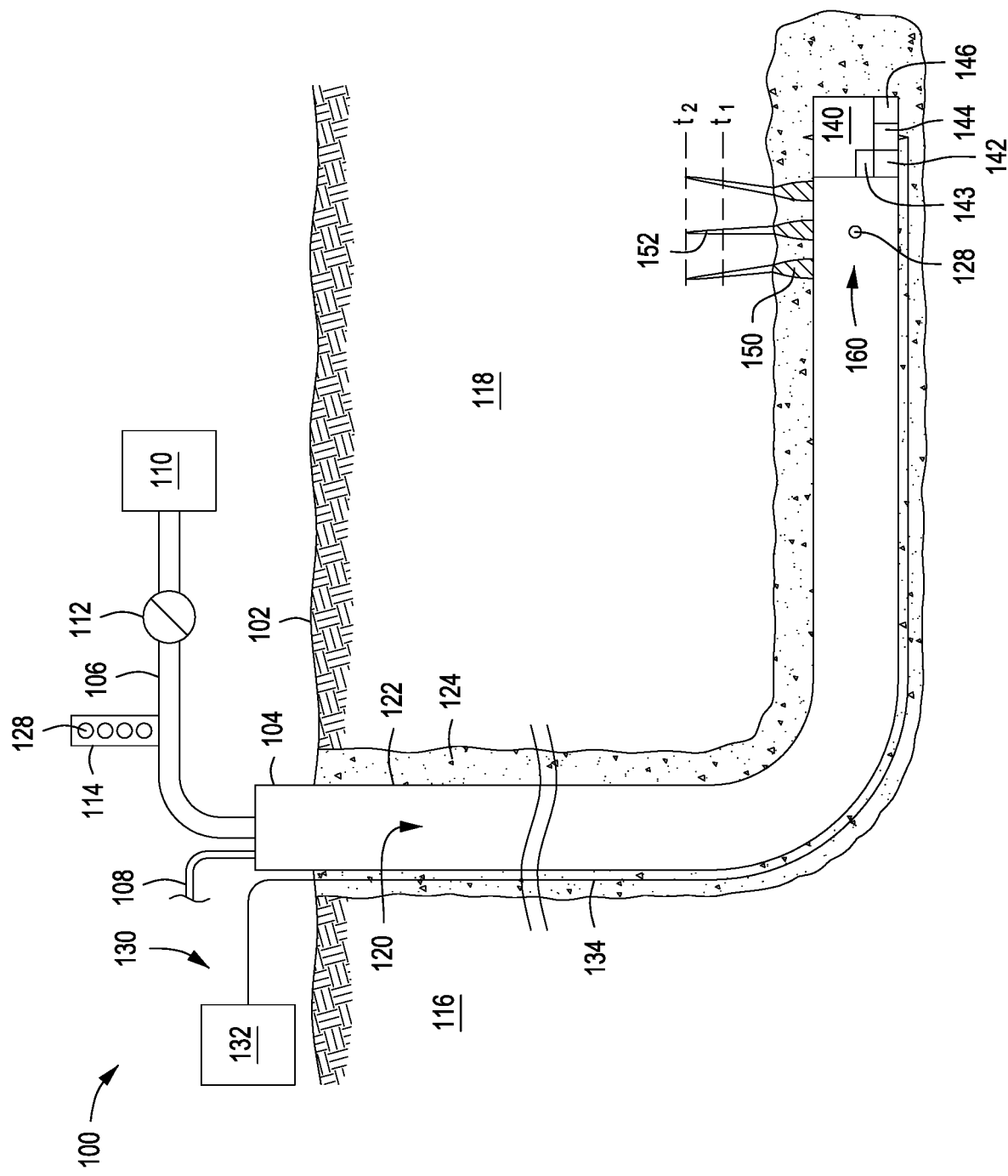

FIG. 1D depicts the subterranean formation 118 has been further fractured with hydrostatic pressure formed by the pump 112, since illustrated in FIG. 1C. The plurality of fractures 152 are depicted with an increased length and/or an increased complexity and/or connectivity. The characterization of the lengths, complexity, and/or connectivity of the fractures 152 at a predetermined time $t_2$ (as noted in FIG. 1D) is determined. Another explosive unit 128 is depicted maintained in the first stage 160 prior to, during, and/or after the continued fracturing operation. At the desired time, the explosive unit 128 is activated to explode or detonate within the first stage 160 to generate another pressure wave that passes through the first group of perforations 150 and further passes into the extended fractures 152 contained in the subterranean formation 118 at time $t_2$. The reflected pressure wave provides another change of pressure that is measured or detected with the pressure sensor 142 contained in the first bridge plug 140 at time $t_2$ to yield another pressure measurement.

Figure 1E:
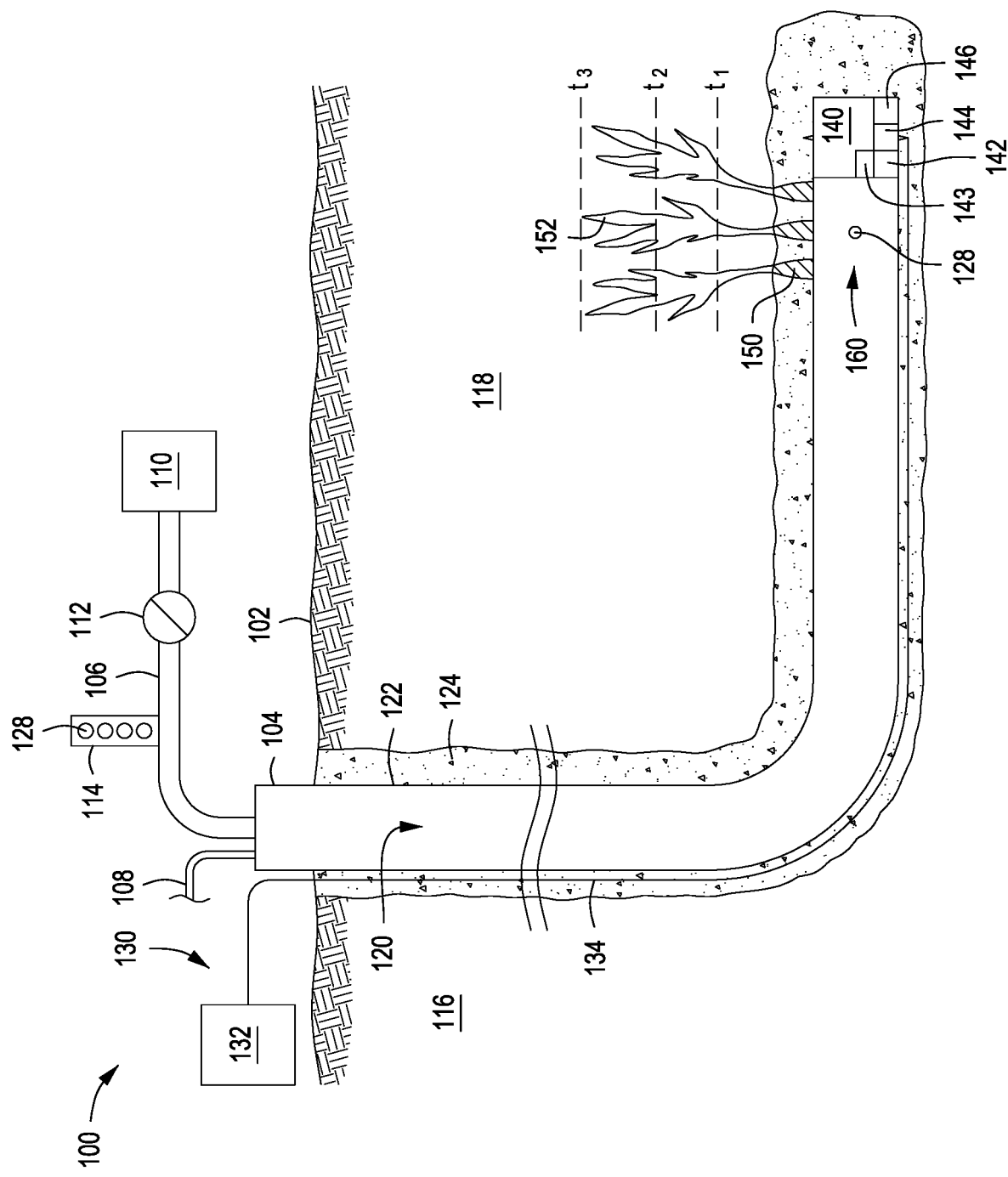
Figure 1F:
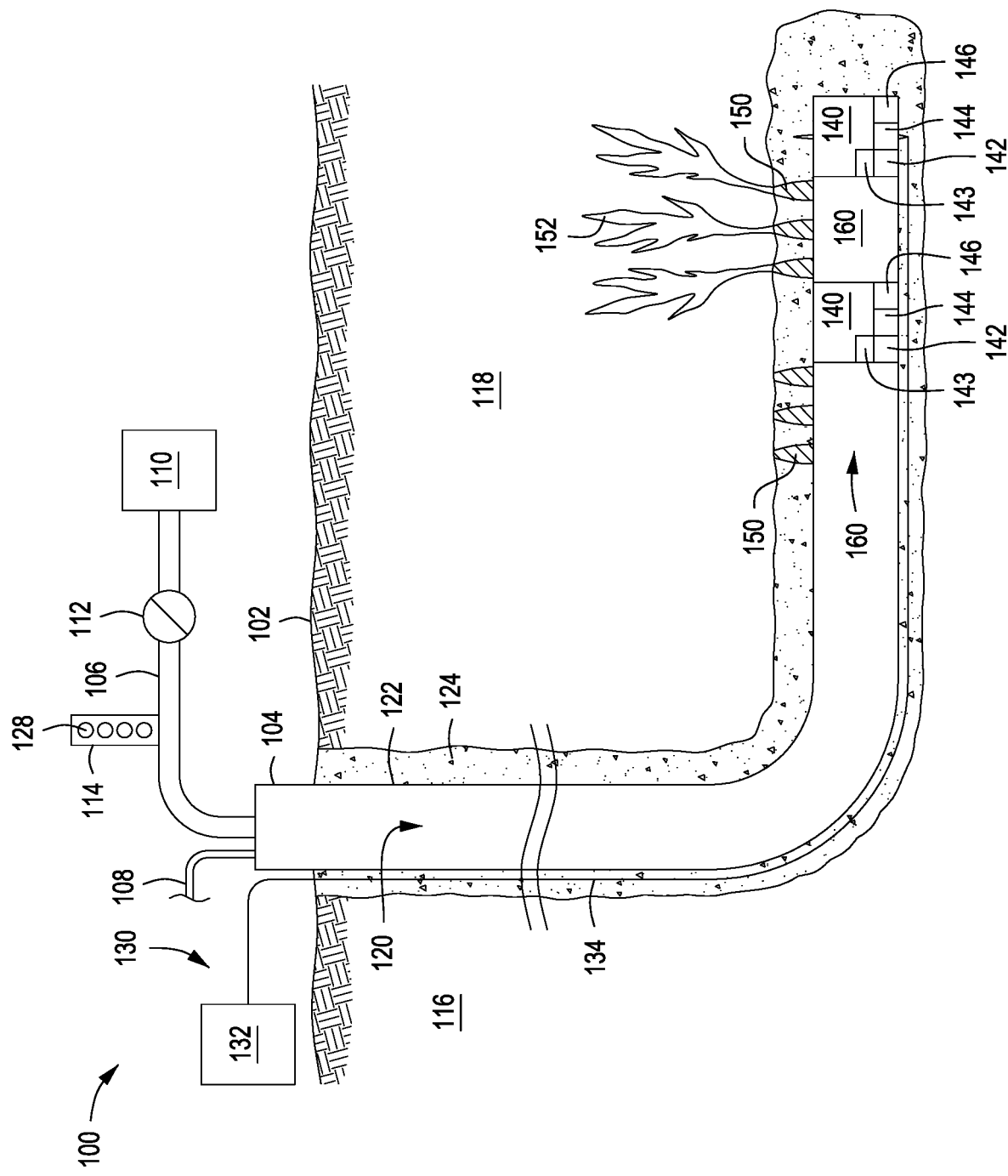
Figure 1G:
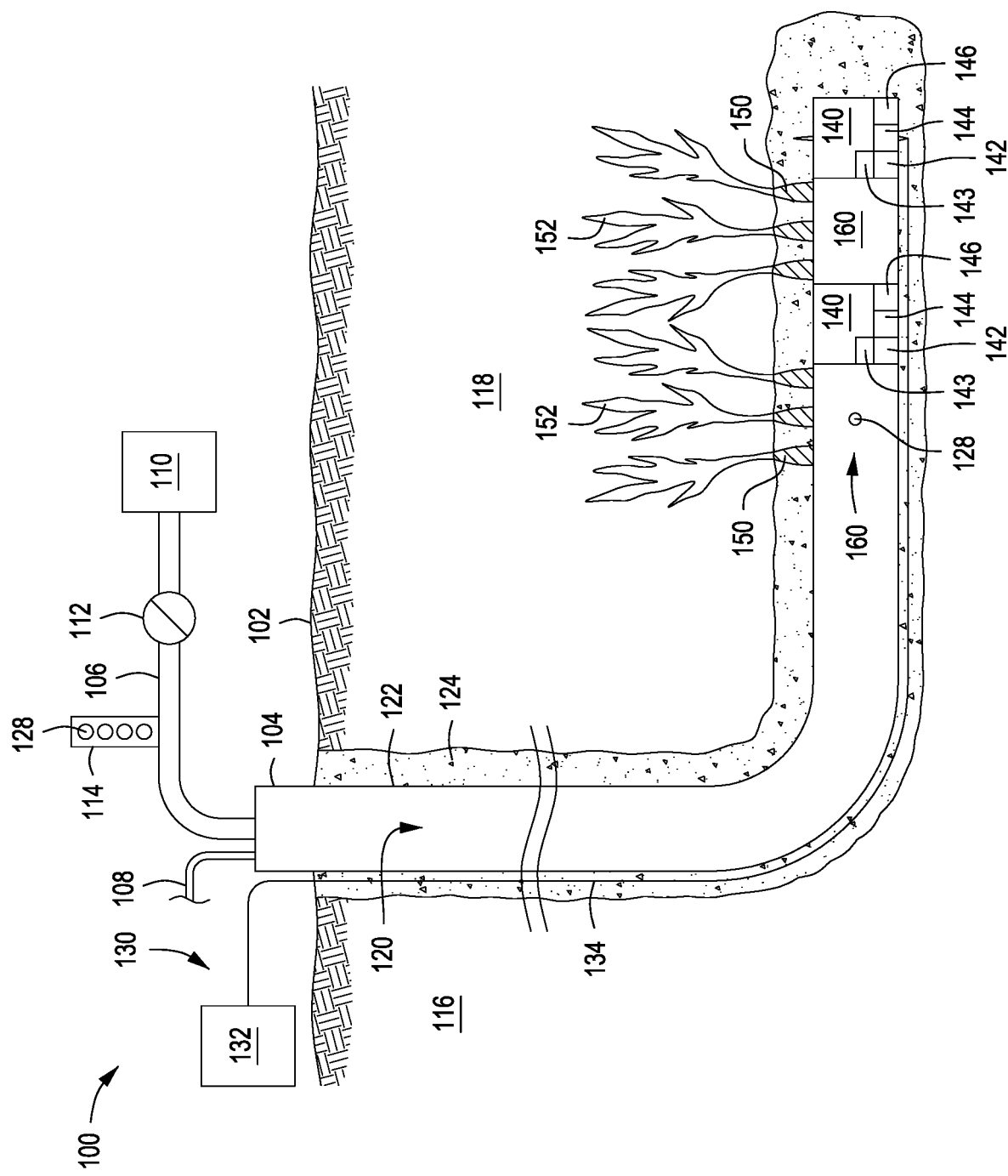
Figure 1H:
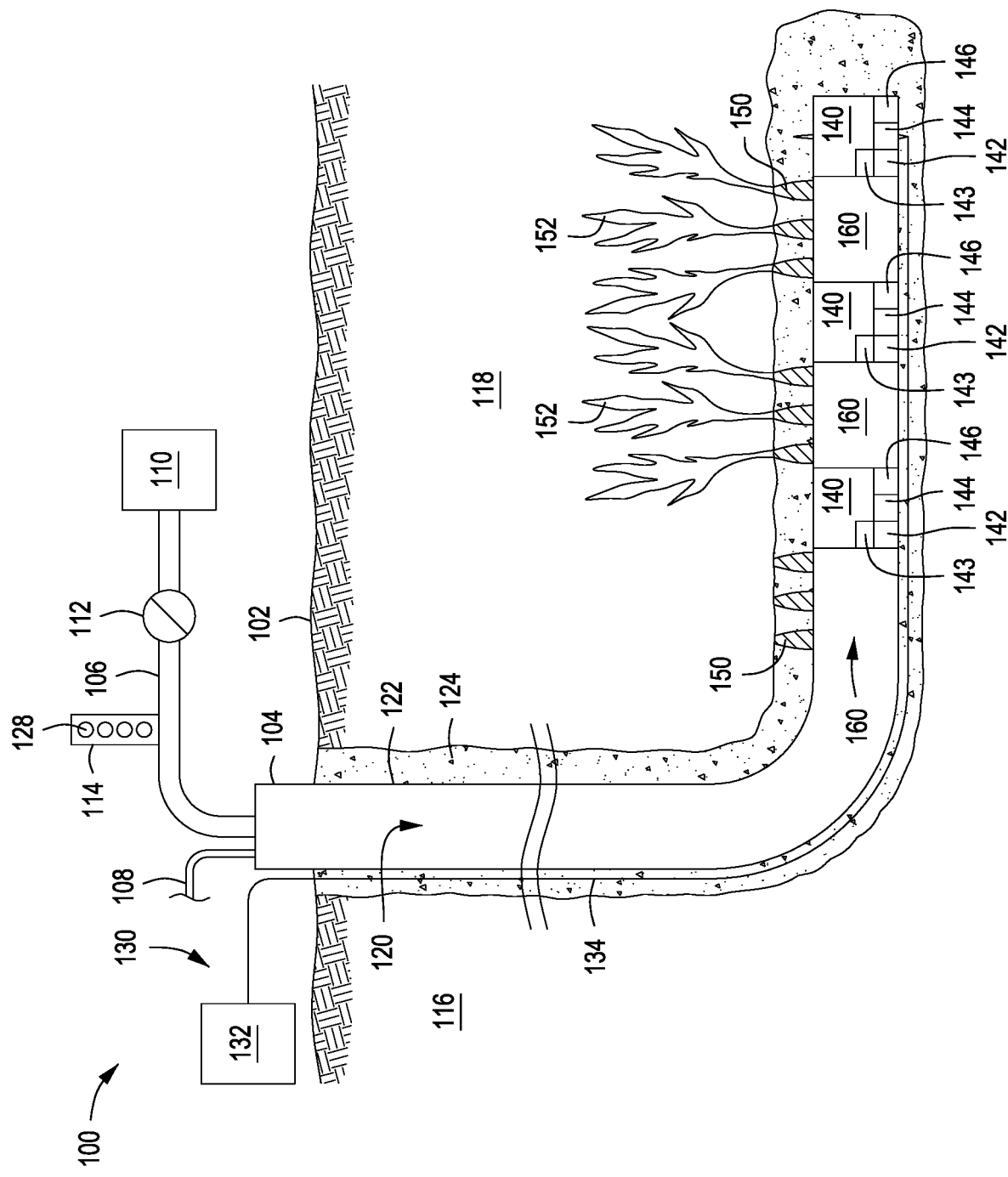
Figure 1I:
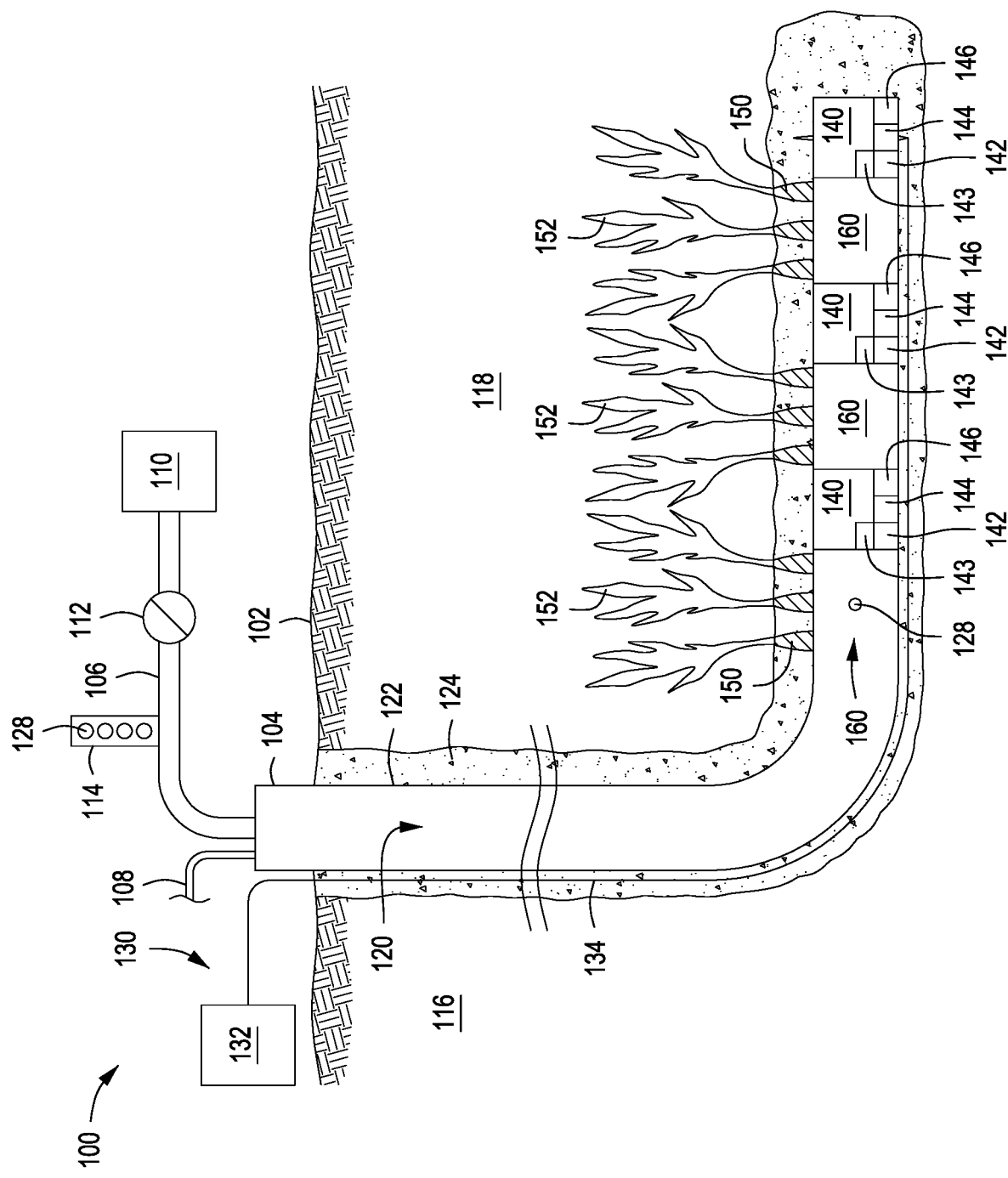

FIG. 1E depicts the subterranean formation 118 has been further fractured with hydrostatic pressure formed by the pump 112, since illustrated in FIG. 1D. The plurality of fractures 152 are depicted with a further increased length and/or a further increased complexity and/or connectivity. The characterization of the lengths, complexity, and/or connectivity of the fractures 152 at a predetermined time $t_3$ (as noted in FIG. 1E) is determined. Another explosive unit 128 is depicted maintained in the first stage 160 prior to, during, and/or after the continued fracturing operation. At the desired time, the explosive unit 128 is activated to explode or detonate within the first stage 160 to generate another pressure wave that passes through the first group of perforations 150 and further passes into the extended fractures 152 contained in the subterranean formation 118 at time $t_3$. The reflected pressure wave provides another change of pressure that is measured or detected with the pressure sensor 142 contained in the first bridge plug 140 at time $t_3$ to yield another pressure measurement.

The acoustic signal generated at each of the times $t_1$, $t_2$, and $t_3$ is indicative to the length of the fractures 152, the complexity or connectivity of the fractures 152, or combinations thereof. Although illustrated at intervals of time $t_1$-$t_3$, the process of generating a pressure wave with the explosive unit 128 and detecting the pressure measurement of the reflected pressure wave can be repeated as many times as desired in order to obtain the lengths, complexity, and/or connectivity of the fractures 152 in the first stage 160. For example, subsequent to transmitting the acoustic signal, the method can further include introducing an additional explosive unit 128 into the casing 122, maintaining the additional explosive unit 128 in the first stage 160, detonating the additional explosive unit 128 within the first stage 160, detecting an additional pressure measurement with the pressure sensor 142, converting the additional pressure measurement into an additional acoustic signal, and transmitting the additional acoustic signal to apply additional acoustic pressure on the fiber optic sensing system 130. In one or more embodiments, a plurality of the pressure waves can be generated from the plurality of the explosive units 128, where each of the pressure waves is separated by a period of time and is generated from detonating each of the explosive units 128 one at a time. The systems and methods depicted in FIGS. 1A-1E can be repeated in each stage 160 within the wellbore 120.

FIG. 1F depicts the system 100 containing a second bridge plug 140 contained in the wellbore 120 and a second group of perforations 150 formed and passing through the casing 122 and the cemented annular 124 in a second stage 160.

FIG. 1G depicts a second group of fractures 152 produced and extended by fracturing the subterranean formation 118 with multiple cycles of hydrostatic pressure formed by the pump 112. Similar to the first group of fractures 152 in fluid communication with the first stage 160 (FIG. 1E), the second group of fractures 152 is in fluid communication with the second stage 160. The explosive unit 128 is depicted maintained or kept in the second stage 160 of the casing 122, adjacent and uphole of the second bridge plug 140, and in front of the second group of perforations 150 formed through the casing 122. The acoustic signal generated at each of the times $t_1$, $t_2$, and $t_3$ is indicative to the length, the complexity, and/or the connectivity of the fractures 152 in fluid communication with the second stage 160 at the specified time. In some examples, one or more diverter agents or flow control agents can be injected or introduced into any one set of fractures 152 for reducing or ceasing fluid communication between fractures in adjourning or adjacent sets of the fractures 152. The diverter agents or flow control agents can be injected or introduced into the fractures 152 one or more times at any period of operations described and discussed herein.

FIG. 1H depicts the system 100 containing a third bridge plug 140 contained in the wellbore 120 and a third group of perforations 150 formed and passing through the casing 122 and the cemented annular 124 in a second stage 160.

FIG. 1I depicts a third group of fractures 152 produced and extended by fracturing the subterranean formation 118 with multiple cycles of hydrostatic pressure formed by the pump 112. Similar to the second group of fractures 152 in fluid communication with the second stage 160 (FIG. 1G), the third group of fractures 152 is in fluid communication with the third stage 160. The explosive unit 128 is depicted maintained or kept in the third stage 160 of the casing 122, adjacent and uphole of the third bridge plug 140, and in front of the third group of perforations 150 formed through the casing 122. The acoustic signal generated at each of the times $t_1$, $t_2$, and $t_3$ is indicative to the length, the complexity, and/or the connectivity of the fractures 152 in fluid communication with the third stage 160.

In one or more embodiments, each of the bridge plugs 140 includes one, two, or more sensors (e.g., the pressure sensor 142 and secondary sensors 143) that are operable to provide a measurement relating to wellbore conditions within stage 160 during various periods of well construction and/or operation. The pressure sensor 142 and the secondary sensors 143 can be realized in a number of different ways depending on a parameter of interest to be monitored. The parameter of interest can include, but is not limited to, pressure, strain, resistivity, chemical composition, chemical concentration, flow rate, temperature, or any combination thereof.

The pressure sensor 142 can be a pressure gauge for measuring pressure within the stage 160, such as during fracturing operations. The pressure sensor 142 faces the uphole direction toward the next stage 160 so that the pressure sensor 142 can record bottom-hole pressure during pumping and also during the shut in period after the next plug has been set. The pressure sensor 142 may be of any suitable configuration of electronic or mechanical construction responsive to pressure surrounding the gauge. In some embodiments, the pressure sensor 142 might include a physically movable or deformable sensing element, such as a diaphragm, directly coupled to processing circuitry 144, or to other sensing circuitry.

Processing circuitry 144 is operably connected to pressure sensor 142 in the bridge plug 140 to receive the measured parameter (e.g., bottom hole pressure) and generate a parameter signal correlated to the parameter. The processing circuitry may be configured to operate in either the analog or the digital domain, depending upon the characteristics of the pressure sensor 142 and the output which it provides. A portion of the processing circuitry 144 for generating a parameter signal from the sensor (in the present example, a pressure gauge) can be or include, for example, an analog to digital converter, as well as various pulse limiting, pulse shaping, filtering, or amplification circuits, as well as other individual circuits. Such structures may be configured to remove any undesired portions of the sensor signal, and to condition the signal for communication as an acoustic signal. In some cases, the processing circuitry 144 may receive an analog signal from the pressure sensor 142, and process the signal entirely in the analog domain. The processing circuitry 144 will preferably include or be connected to a transducer 146 (which may be any of various forms), to produce an acoustic signal sufficient to perturb the fiber optic cable 134. An "acoustic signal" as utilized herein is any vibrational signal (which may also be considered as a varying compressional signal), whether humanly audible or not, which may be detected to result in communication of the signal (and/or any data represented by the signal) from one location to another. The transducer can be integrated with the processing circuitry 144, integrated with the pressure sensor 142, or can represent a separate structure coupled to the processing circuitry 144. In some embodiments, the parameter signal can be a "compensated signal," having a characteristic that corresponds to the parameter of interest for which variations in one or more other parameters are corrected or removed, or for which the characteristic is isolated to the parameter of interest.

The transducer or acoustic signal generator 146 is positioned in proximity to the casing 122 to communicate an acoustic signal through the casing 122 to fiber optic cable 134. The fiber optic cable 134 extends along the exterior of the casing 122 to one or more regions of interest and is coupled to the casing 122, which can be cemented in place within the wellhole 110. The fiber optic cable 134 is well-coupled to the casing 122 such that acoustic signals from the transducer 146 can traverse the casing 122 and result in perturbations to optical signals within the fiber optic cable 134. For example, such a transducer 146 can be constructed as a vibrator, or other oscillating device. In this way, the vibrations of the acoustic signal can be transferred from the transducer 146 through the casing 122, and possibly a portion of the cement sheath (and any other intervening elements) to the fiber optic cable 134. In some embodiments, the transducer 146 can be a voice coil actuator that generates signals at one or more frequencies sufficient to communicate through the casing 122 to the fiber optical to induce a strain into the fiber optic cable 134.

It is noted that the bridge plug 140 is not limited to include a single transducer 146. It can be desirable to have multiple transducers 146 in bridge plug 140. For example, a different transducer 146 can be positioned in bridge plug 140 for each of the one or more pressure sensors 142 included in the bridge plug 140. Generally, each of these different transducers 146 will operate at a different frequency from each other. Alternatively, multiple transducers 146 might be used for a single sensed parameter to communicate signals at different times and/or frequencies and/or with one or more modulation schemes to facilitate redundancy of communications and/or error detection and/or correction capability.

The perturbations in the fiber optic cable 134 alter the physical characteristics of the fiber to affect propagation of light. Disturbances in the light propagating through the fiber optic cable 134 can be due to acoustic signals. The acoustic signals can change the index of refraction of the fiber optic cable 134 or mechanically deform the fiber optic cable 134 such that Rayleigh backscatter property of the fiber optic cable 134 changes.

The effects on the light propagation are related to the parameter signal used to generate the perturbation. Thus, an analysis of the effects on light propagation can provide data regarding the parameter signal that generated the perturbation and the measured parameter of interest. In other words, an acoustic signal representative of a parameter of interest (e.g., pressure in the wellbore 120) is provided to the fiber optic cable 134. The acoustic signal traverses any casing, cement, and any additional intervening elements positioned between the bridge plug 140 and fiber optic cable 134. In this way, a light signal carried by the fiber optic cable 134 is modulated.

Light signals propagating in the fiber optic cable 134 can be analyzed to extract the parameter signal from the fiber optic cable 134. In one embodiment, the interrogator unit 132 is used to extract the parameter signal from the fiber optic cable 134. The interrogator unit 132 is positioned uphole from the bridge plug 140 (e.g., at the surface) that is configured to interrogate the fiber optic cable 134 and receive an optical signal including the effects of the perturbation. In an example, the received signal is a back scattered optical signal.

The interrogator unit 132 can be structured, for example, to inject a laser pulse into the fiber optic cable 134. As the pulse travels down the fiber optic cable 134, Rayleigh back scattered light is generated by impurities within the silica lattice structure of the fiber optic cable 134. The backscattered light from the pulses will interfere with each other, generating a signal amplitude and/or phase change that is dependent on the amount of strain on the fiber optic cable 134 at the location where the back scattered light originates. It is noted that the strain on the fiber optic cable 134 depends on the perturbation of the fiber optic cable 134 by the transducer 146. The signal is effectively a representation of the instantaneous strain on the fiber optic cable 134, which can be generated by sound (e.g., pressure waves and shear waves) and, at low frequencies, changes in temperature.

Rayleigh back-scattered light is collected back at the surface using the interrogator unit 132 and recombined with the input signal to determine an amplitude and phase associated with the depth from which the signal came. In this way, a value of the measured parameter of interest is extracted by receiving the optical signal from the perturbation. Thus, the fiber optic cable 134 can be segregated into many acoustic channels of a chosen length along the whole length of the fiber, limited by the speed of the switch generating the laser pulse. The resulting signal can have a bandwidth of about 20 kHz on a long fiber (e.g., about 4 km long) (although it can be much higher on shorter fibers) with channel lengths ranging from about 1 m to about 100 m, about 1 m to about 50 m, or about 1 m to about 10 m. It is further noted that since the frequency range of the signal is known, a filter can be included, such as at the surface, as a portion of the interrogator, to enhance the signal to noise ratio (SNR) of the received signal.

FIG. 2 is a schematic view of a downhole system 200 containing one or more explosive charges 228 positioned on each bridge plug 240 located in the wellbore 120, according to one or more embodiments. The system 200 can be used to characterize fractures 152 in the subterranean formation 118. The bridge plugs 240 separate or otherwise at least partially define stages 260 disposed between two bridge plugs 240 and the casing 122. Each of the bridge plug 240 includes one or more pressure sensors 142, one or more secondary sensors 143, the processing circuitry 144, and one or more transducers or acoustic signal generators 146. The pressure sensor 142 detects a pressure measurement within the adjacent uphole stage 260. Each of the explosive charges 228 can independently face the stage 260 and the bridge plug 240 which are adjacent and further downhole. As such, the pressure sensor 142 located on any bridge plug 240 measures the pressure wave generated by an explosion in the adjacent uphole stage 260 produced by an explosive charge 228 positioned on the adjacent uphole bridge plug 240. The explosive charges 228 can be or include the same type or a similar type of perforation charges used to form the perforations 150. Therefore, the detonation initiation of the explosive charges 228 can be controlled by a wireline or other tools used to set the bridge plugs 240 or can be controlled by a wireless remote initiation.

Alternatively, each of the explosive charges 228 can be an explosive with a time delayed initiation. The explosive charge 228 can be operably coupled to a timing circuit in the bridge plug 240. In other configurations, the explosive charge 228 can be or include one or more encapsulated explosive units. The explosive charge 228, as an encapsulated explosive unit, contains one or more explosive or highly energetic materials at least partially encapsulated, coated, or surrounded by one or more protective coatings. The explosive charges 228 can be similar to the explosive unit 128 discussed above (the same or similar explosive or highly energetic materials and/or protective coatings), but the explosive charges 228 are also imbedded, contained, or otherwise coupled to the bridge plug 240.

In one or more examples, the explosive charge 228, as an encapsulated explosive unit, can be detonated within the stage 260 by dissolving or degrading the protective coating from the explosive or highly energetic material contained within the explosive charge 228 by one or more chemical agents. In some embodiments, the chemical agent is injected or introduced into any of the stages 260 to dissolve or degrade the protective coating from the explosive or highly energetic material. The chemical agent can be or include, but is not limited to one or more solvents, one or more reagents, or a combination thereof. In other examples, the protective coating can be dissolved or degraded from the explosive or highly energetic material by controlling the temperature of the fluid, the pH of the fluid, the concentration of one or more chemical agents or solvents within the fluid, or any combination thereof. The explosive or highly energetic materials can be detonated upon being exposed to water or other compounds contained in the fluid.

The bridge plug 240 blocks the wellbore 120 toward the heel-side or uphole side from pressure communication within the adjacent downhole stage 260. This confinement or constraint of the explosion forces the generated pressure wave into the perforations 150 and the fractures 152, as opposed to allowing the pressure wave to travel toward the heel-side of the wellbore 120 and up to the surface 102. Each stage 260 has a particular volume that can be matched with a predetermined type and amount of explosive charge 228.

Figure 3:
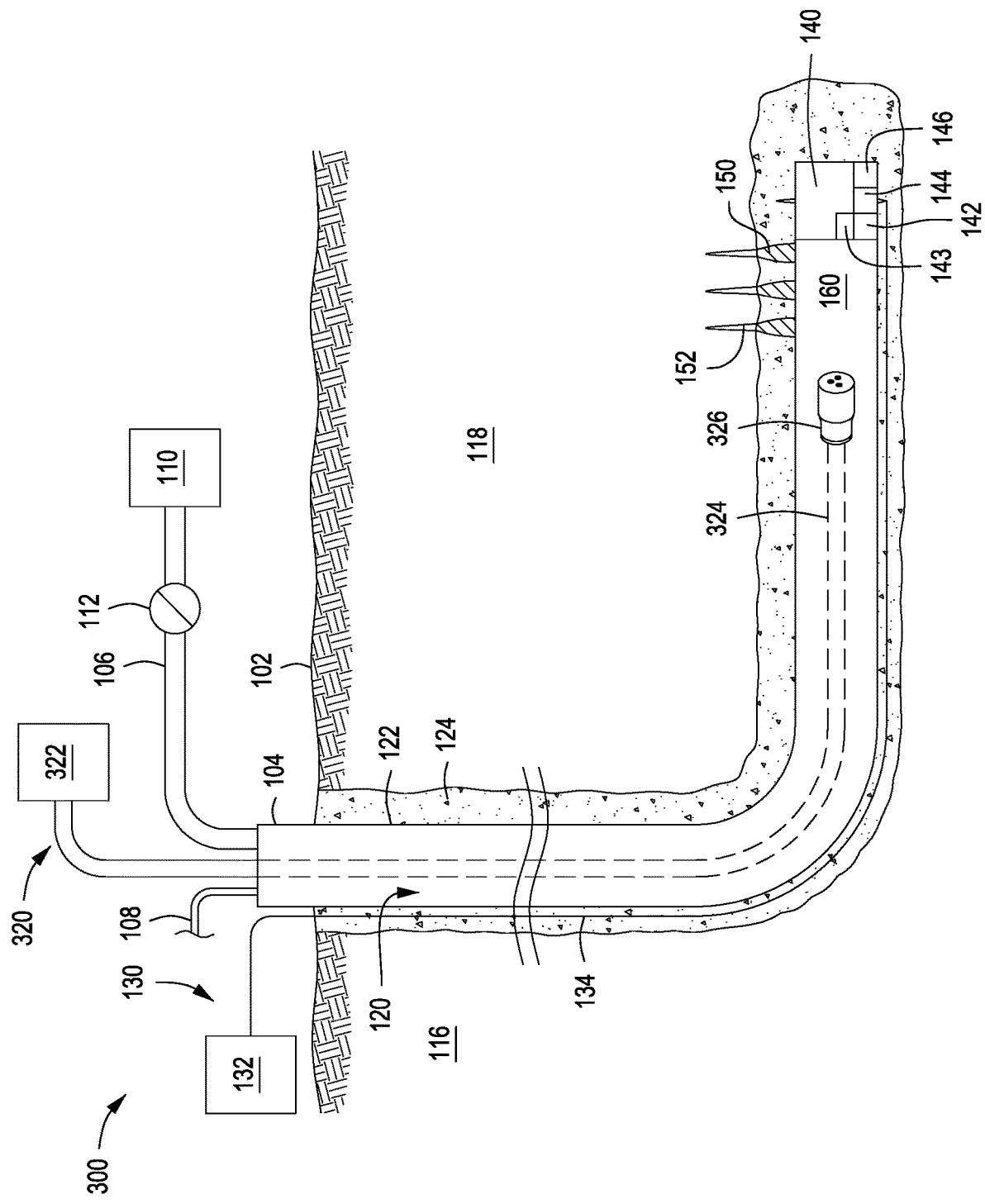
FIG. 3 is a schematic view of another system for characterizing fractures in a subterranean formation, according to one or more embodiments.

FIG. 3 is a schematic view of a downhole system 300 that contains a fluid hammer system 320 used to generate pressure waves or events downhole in the wellbore 120, according to one or more embodiments. The generated pressure waves or events can be used to characterize the fractures 152 in the subterranean formation 118, such as to provide real-time characterization of fracture length, fracture complexity, and/or fracture connectivity on demand during and/or after a fracturing operation within the wellbore 120.

The fluid hammer system 320 includes a body 322 coupled to a hammer head 326 via a line 324. The body 322 can be or include a tank or reservoir, a fluid source, a pump, one or more valves, a control unit, or any combination thereof. The line 324 can be or include, but is not limited to one or more pipes, hoses, strings, conduits, valves, or any combination thereof. The hammer head 326 can include one or more valves, one or more nozzles, or any combination thereof. The fluid hammer system 320 produces or otherwise generates pressure waves by suddenly closing a valve with a pressurized and flowing fluid. The fluid can be or include, but is not limited to, water, steam, mud, one or more gases, one or more aqueous solutions, one or more organic solutions, or any combination thereof. Fluid hammer systems 320 that may be used in system 300 can be or include, but are not limited to, one or more water-powered hammers, mud-powered hammers, water-powered drills, mud-powered drills, or similar fluid-powered hammers, drills, or any combination thereof.

As depicted in FIG. 3, the hammer head 326 can release one or more pressure waves into the stage 160 located between the casing 122, the bridge plug 140, and the hammer head 326. The pressure wave can travel into the perforations 150 and the fractures 152 and eventually the reflected pressure wave can be measured by the pressure sensor 142 and/or the secondary sensor 143 within each bridge plug 140. The reflected pressure waves can be used to characterize the fractures 152, such as to provide real-time characterization of fracture length, fracture complexity, and/or fracture connectivity on demand during and/or after the fracturing operation within the wellbore 120.

It is to be recognized that systems 100, 200, and 300 are merely exemplary in nature and various additional components can be present that have not necessarily been depicted in the Figures in the interest of clarity. Non-limiting additional components that can be present include, but are not limited to, supply hoppers, valves, condensers, adapters, joints, gauges, sensors, compressors, pressure controllers, pressure sensors, flow rate controllers, flow rate sensors, temperature sensors, or any combination thereof. Such components can also include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, or valves), logging tools and related telemetry equipment, actuators (e.g., electromechanical devices or hydromechanical devices), sliding sleeves, production sleeves, screens, filters, flow control devices (e.g., inflow control devices, autonomous inflow control devices, or outflow control devices), couplings (e.g., electro-hydraulic wet connect, dry connect, or inductive coupler), control lines (e.g., electrical, fiber optic, or hydraulic), surveillance lines, drill bits and reamers, sensors or distributed sensors, downhole heat exchangers, valves and corresponding actuation devices, tool seals, packers, cement plugs, bridge plugs, other wellbore isolation devices or components, or any combination thereof. Any of these components can be included in the systems and apparatuses generally described above and depicted in Figures.

Figure 4:
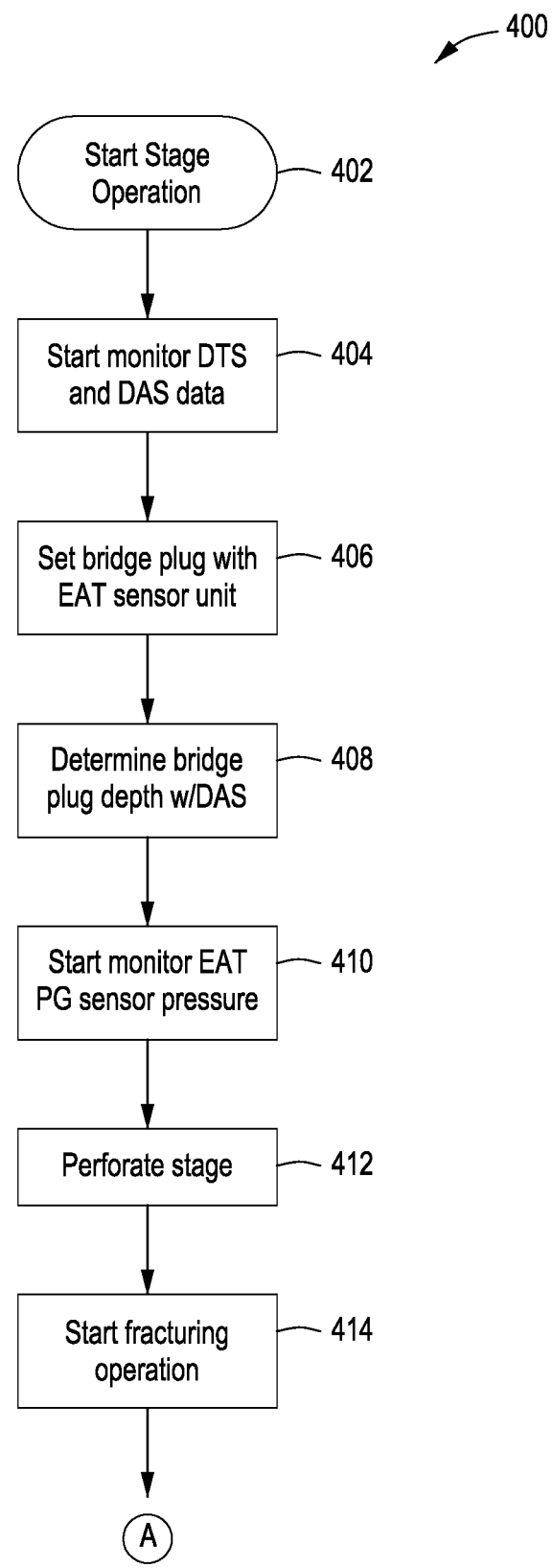
FIG. 4 depicts a flow chart of an exemplary process for producing and characterizing fractures in a subterranean formation, according to one or more embodiments.
Figure 4:
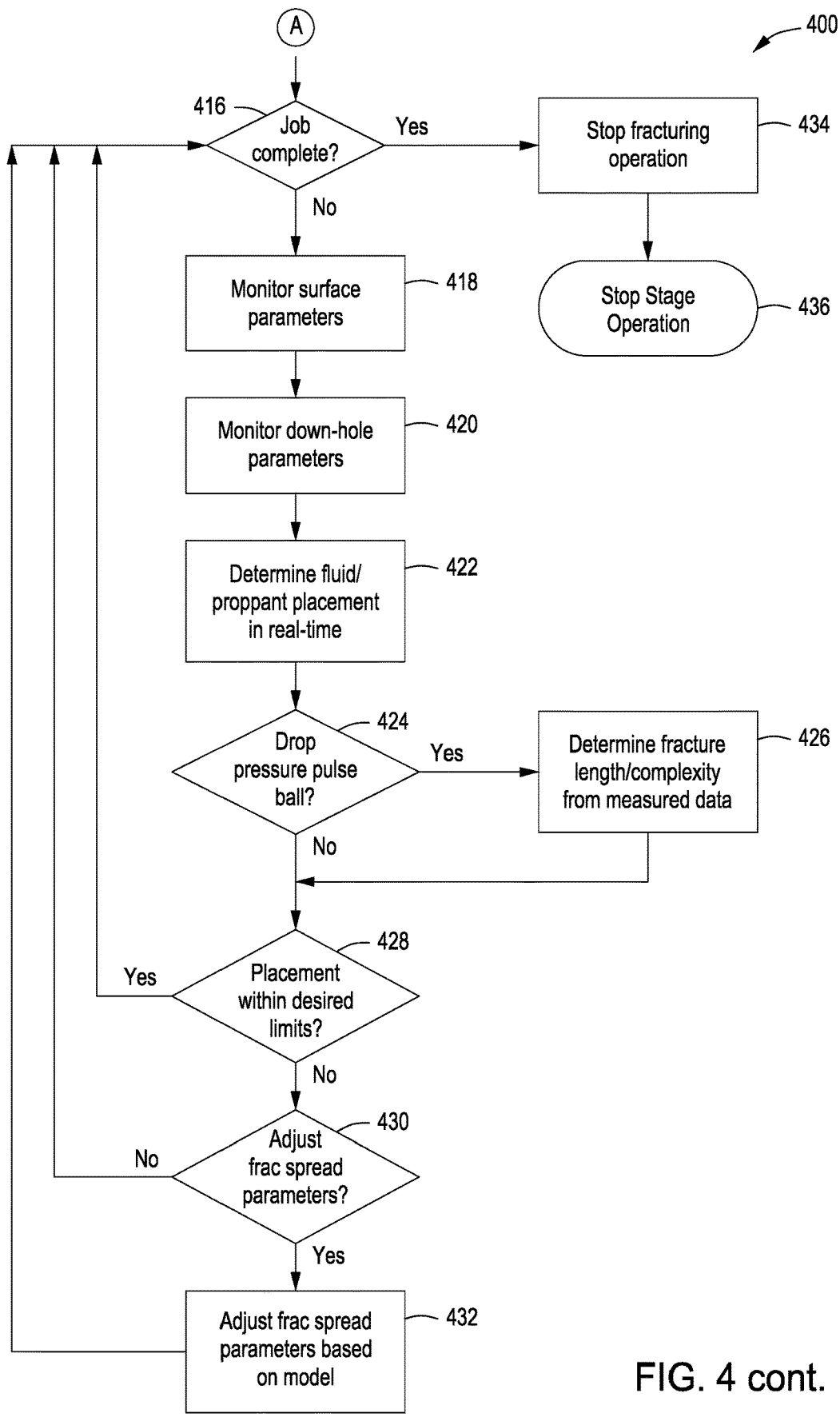

FIG. 4 depicts a flow chart of an exemplary process 400 for producing and characterizing fractures in a subterranean formation, according to one or more embodiments. The process 400 and portions thereof can be utilized with the systems 100, 200, and 300, as well as other systems not described and discussed herein.

At 402, start stage operation in the casing that is located in the wellbore extending into the subterranean formation.

At 404, start monitoring DTS and DAS data. The method includes at least one of: determining fracture initiation points of the subterranean formation adjacent each stage by DTS via the fiber optic sensing system, determining fluid allocations for the subterranean formation adjacent each stage by DAS via the fiber optic sensing system, or a combination thereof. The determination of the fracture initiation points of the subterranean formation and/or the fluid allocations for the subterranean formation can occur prior to, during, and/or subsequent to any one of the steps of the process 400.

At 406, set the bridge plug with EAT sensor unit including the pressure sensor and the secondary sensors into the casing.

At 408, determine the bridge plug depth with DAS.

At 410, start monitoring EAT PG sensor pressure with the pressure sensor and the secondary sensors.

At 412, form a group of perforations through the casing and the cement annulus in the stage.

At 414, start fracturing operation to generate fractures within the subterranean formation via hydrostatic pressure formed by the pump.

At 416, determine if overall operation is complete? If yes, stop fracturing operation (at 434) and then stop stage operation (at 436). If no, monitor surface parameters (at 418).

At 418, monitor surface parameters.

At 420, monitor downhole parameters.

At 422, determine fluid/proppant placement in real-time.

At 424, determine if there is a drop pressure pulse ball? If yes, determine the fracture length, complexity, and/or connectivity from measured data (at 426). If no, determine if placement is within the desired limits or values (at 428).

At 426, determine the fracture length, complexity, and/or connectivity from measured data.

At 428, determine if placement is within desired limits or values? If yes, then determine if overall operation is complete (at 416). If no, determine if adjusting frac spread parameters in fracturing operation is needed (at 430).

At 430, determine if adjusting frac spread parameters in fracturing operation is needed? If no, then determine if overall operation is complete (at 416). If yes, adjust frac spread parameters in fracturing operation based on model (at 432).

At 432, adjusting frac spread parameters in fracturing operation based on model.

At 434, stop fracturing operation.

At 436, stop stage operation.

In one or more embodiments, the system can include a plurality of bridge plugs positioned at downhole locations in the casing. Each of the bridge plugs can include one or more pressure sensors, processing circuitry, and one or more acoustic signal generators. A plurality of stages are positioned throughout the casing, such that each stage is uphole to the adjacent bridge plug and each stage contains perforations formed through the casing. The pressure sensor is oriented to detect pressures experienced in the stage uphole of the adjacent bridge plug containing the respective pressure sensor. The plurality of stages downhole in the casing can include about 5 stages to about 80 stages, about 20 stages to about 60 stages, or about 40 stages to about 50 stages.

In another embodiment, a method for characterizing fractures in the subterranean formation can include positioning a first bridge plug downhole in the casing located in a wellbore, generating a pressure wave by an explosion or a fluid hammer system (e.g., water or mud hammer or drill) in a first stage of the casing, passing the pressure wave through a first group of perforations formed through the casing and into the fractures contained in the subterranean formation, detecting a pressure measurement with a pressure sensor contained in or coupled to the first bridge plug, converting the pressure measurement into an acoustic signal correlated with the pressure measurement by an acoustic signal generator contained in the first bridge plug, and transmitting the acoustic signal to apply acoustic pressure on a fiber optic cable coupled to an exterior surface of the casing.

In one or more embodiments, the method for characterizing fractures in a subterranean formation can include forming a plurality of stages downhole in the casing. To form each stage, the method can include positioning a bridge plug into the casing, forming a group of perforations through the casing adjacent to the bridge plug, generating a pressure wave by an explosion or a fluid hammer system (e.g., water or mud hammer or drill) in adjacent the bridge plug, passing the pressure wave through the perforations and into the fractures contained in the subterranean formation adjacent the bridge plug, detecting a pressure measurement with a pressure sensor contained in or coupled to the bridge plug, converting the pressure measurement into an acoustic signal correlated with the pressure measurement by an acoustic signal generator contained in the bridge plug, and transmitting the acoustic signal to apply acoustic pressure on a fiber optic cable coupled to an exterior surface of the casing. Prior to or during the generation of each pressure wave, the method further includes at least one of: determining fracture initiation points of the subterranean formation adjacent each stage by DTS via the fiber optic sensing system, determining fluid allocations for the subterranean formation adjacent each stage by DAS via the fiber optic sensing system, or a combination thereof.

In addition to the embodiments described above, embodiments of the present disclosure further relate to one or more of the following paragraphs:

1. A method for characterizing fractures in a subterranean formation containing a wellbore extending from a ground surface, comprising: introducing an encapsulated explosive unit into a casing located in the wellbore; maintaining the encapsulated explosive unit in a first stage of the casing while passing a fluid through the casing, the first stage is located between the ground surface and a first bridge plug positioned downhole in the casing, and the fluid passes through a first group of perforations formed through the casing in the first stage; detonating the encapsulated explosive unit within the first stage to generate a pressure wave that passes through the first group of perforations and further passes into the fractures contained in the subterranean formation; measuring a reflected pressure wave passing in the first stage using a pressure sensor coupled to the first bridge plug to produce a pressure measurement, wherein the pressure wave is reflected from the fractures to produce the reflected pressure wave; converting the pressure measurement into an acoustic signal correlated with the pressure measurement by using an acoustic signal generator contained in the first bridge plug; and transmitting the acoustic signal to apply acoustic pressure on a fiber optic cable coupled to an exterior surface of the casing.

2. A system for characterizing fractures in a subterranean formation containing a casing located in a wellbore extending from a ground surface, the system comprising: bridge plugs positioned at downhole locations in the casing, wherein each of the bridge plugs comprises a pressure sensor and an acoustic signal generator; stages positioned throughout the casing, wherein each stage is uphole to an adjacent bridge plug and each stage comprises perforations formed through the casing; an encapsulated explosive unit disposed downhole in the stage nearest the ground surface, wherein the encapsulated explosive unit has a size too large to allow the encapsulated explosive unit passage through the perforations in the stage; and a fiber optic cable coupled to an exterior surface of the casing and configured to detect acoustic signals from the acoustic signal generator.

3. The system of paragraph 2, further comprising an explosive unit distributer containing a plurality of the encapsulated explosive units and configured to introduce the encapsulated explosive units downhole into the casing from the ground surface.

4. A method for characterizing fractures in a subterranean formation containing a casing located in a wellbore extending from a ground surface, comprising: positioning a bridge plug downhole in the casing; generating a pressure wave by an explosion or a fluid hammer system in a stage of the casing, the stage is uphole of the bridge plug; passing the pressure wave through a group of perforations formed through the casing and into the fractures contained in the subterranean formation; measuring a reflected pressure wave passing in the stage using a pressure sensor coupled to the bridge plug to produce a pressure measurement, wherein the pressure wave is reflected from the fractures to produce the reflected pressure wave; converting the pressure measurement into an acoustic signal correlated with the pressure measurement by using an acoustic signal generator contained in the bridge plug; and transmitting the acoustic signal to apply acoustic pressure on a fiber optic cable coupled to an exterior surface of the casing.

5. A method for characterizing fractures in a subterranean formation containing a casing located in a wellbore extending from a ground surface, comprising: forming a plurality of stages downhole in the casing; wherein forming each stage comprises: positioning a bridge plug into the casing, forming a group of perforations through the casing adjacent to the bridge plug, generating a pressure wave by an explosion or a fluid hammer system adjacent the bridge plug, passing the pressure wave through the perforations and into the fractures contained in the subterranean formation adjacent the bridge plug, measuring a reflected pressure wave passing in the stage using a pressure sensor coupled to the bridge plug to produce a pressure measurement, wherein the pressure wave is reflected from the fractures to produce the reflected pressure wave, converting the pressure measurement into an acoustic signal correlated with the pressure measurement by an acoustic signal generator contained in the bridge plug, and transmitting the acoustic signal to apply acoustic pressure on a fiber optic cable coupled to an exterior surface of the casing; and wherein prior to or during the generation of each pressure wave, the method further comprises at least one of: determining fracture initiation points of the subterranean formation adjacent each stage by distributed temperature sensing using a fiber optic sensing system comprising the fiber optic cable, determining fluid allocations for the subterranean formation adjacent each stage by distributed acoustic sensing using the fiber optic sensing system, or a combination thereof.

6. The method of paragraph 4 or 5, wherein the pressure wave is generated by the fluid hammer system, and wherein the fluid hammer system comprises a water-powered hammer, a mud-powered hammer, a water-powered drill, a mud-powered drill, or any combination thereof.

7. The method of paragraph 4 or 5, wherein the pressure wave is generated by the explosion, and further comprising detonating an encapsulated explosive unit within the stage to generate the pressure wave.

8. The method of paragraph 7, further comprising: introducing the encapsulated explosive unit into the casing from the ground surface; and maintaining the encapsulated explosive unit in the stage by having a size of the encapsulated explosive unit too large to allow the encapsulated explosive unit passage through the perforations in the stage.

9. The method or the system according to any one of paragraphs 1-8, wherein prior to or subsequent to introducing the encapsulated explosive unit into the casing, the method further comprises determining fracture initiation points of the subterranean formation adjacent the first stage by distributed temperature sensing using a fiber optic sensing system comprising the fiber optic cable.

10. The method or the system according to any one of paragraphs 1-9, wherein prior to introducing the encapsulated explosive unit into the casing, the method further comprises determining fluid allocations for the subterranean formation adjacent the first stage by distributed acoustic sensing using a fiber optic sensing system comprising the fiber optic cable.

11. The method or the system according to any one of paragraphs 1-10, wherein prior to detonating the encapsulated explosive unit within the first stage, the method further comprises fracturing the subterranean formation to produce the fractures, increasing the length of the fractures, increasing the complexity or connectivity of the fractures, or combinations thereof.

12. The method or the system according to any one of paragraphs 1-11, wherein the acoustic signal is indicative to the length of the fractures, the complexity of the fractures, the connectivity of the fractures, or combinations thereof.

13. The method or the system of paragraph 12, further comprising introducing a diverter agent into the fractures.

14. The method or the system according to any one of paragraphs 1-13, wherein the encapsulated explosive unit is maintained in the first stage of the casing by having a size of the encapsulated explosive unit too large to allow the encapsulated explosive unit passage through the perforations in the first stage.

15. The method or the system according to any one of paragraphs 1-14, wherein the encapsulated explosive unit has a diameter of about 1 inch to about 5 inches.

16. The method or the system according to any one of paragraphs 1-15, wherein the encapsulated explosive unit has a diameter of about 1.5 inch to about 3 inches.

17. The method or the system according to any one of paragraphs 1-16, wherein the encapsulated explosive unit comprises an explosive material at least partially encapsulated by a polymeric coating.

18. The method or the system according to any one of paragraphs 1-17, wherein detonating the encapsulated explosive unit within the first stage comprises dissolving or degrading a protective coating from an explosive material contained within the encapsulated explosive unit.

19. The method or the system of paragraph 18, further comprising controlling at least one of temperature, pH, chemical agent concentration, or combinations thereof to dissolve or degrade the protective coating from the explosive material.

20. The method or the system of paragraph 18, further comprising introducing a chemical agent into the first stage to dissolve or degrade the protective coating from the explosive material.

21. The method or the system of paragraph 20, wherein the chemical agent comprises a solvent, a reagent, or a combination thereof.

22. The method or the system according to any one of paragraphs 1-21, wherein detonating the encapsulated explosive unit within the first stage comprises applying a force to the encapsulated explosive unit, the force is selected from the group consisting of a pressure force, an electromagnetic force, and combinations thereof.

23. The method or the system according to any one of paragraphs 1-22, wherein the encapsulated explosive unit is introduced into the casing from an explosive unit distributer containing a plurality of the encapsulated explosive units.

24. The method or the system of paragraph 23, further comprising generating a plurality of the pressure waves from the plurality of the encapsulated explosive units, wherein each of the pressure waves is separated by a period of time and is generated from detonating the encapsulated explosive units one at a time.

25. The method or the system according to any one of paragraphs 1-24, wherein subsequent to transmitting the acoustic signal, the method further comprises: introducing an additional encapsulated explosive unit into the casing; maintaining the additional encapsulated explosive unit in the first stage while passing the fluid through the first group of perforations; detonating the additional encapsulated explosive unit within the first stage; detecting an additional pressure measurement with the pressure sensor; converting the additional pressure measurement into an additional acoustic signal; and transmitting the additional acoustic signal to apply additional acoustic pressure on the fiber optic cable.

26. The method or the system according to any one of paragraphs 1-25, wherein subsequent to transmitting the acoustic signal, the method further comprises: positioning a second bridge plug downhole in the casing, the first stage is located between the first and second bridge plugs and a second stage is located between the ground surface and the second bridge plug; and forming a second group of perforations through the casing in the second stage, the second group of perforations is in fluid communication with a second group of fractures contained in the subterranean formation.

27. The method or the system of paragraph 26, further comprising: introducing a second encapsulated explosive unit into the second stage; detonating the encapsulated explosive unit within the second stage to generate a second pressure wave that passes through the second group of perforations and further passes into the second group of fractures; detecting a second pressure measurement with a second pressure sensor coupled to the second bridge plug; converting the second pressure measurement into a second acoustic signal correlated with the second pressure measurement by a second acoustic signal generator contained in the second bridge plug; and transmitting the second acoustic signal to apply acoustic pressure on the fiber optic cable.

28. The method or the system according to any one of paragraphs 1-27, further comprising measuring a seismic signal using a seismic sensor coupled to the first bridge plug.

29. The method or the system of paragraph 28, wherein the seismic signal is generated from at least one of detonating the encapsulated explosive unit or another explosive, performing a fracturing operation, a vibrator unit, or combinations thereof.

30. The method or the system according to any one of paragraphs 1-29, wherein the pressure sensor is oriented to detect pressures experienced in the stage uphole of the bridge plug comprising the respective pressure sensor.

31. The method or the system according to any one of paragraphs 1-30, wherein the bridge plug further comprises a second sensor and a second signal generator, and wherein the second sensor is a temperature sensor or an acoustic sensor.

32. The method or the system according to any one of paragraphs 1-31, wherein the bridge plug further comprises a second sensor and a second signal generator, and wherein the second sensor is a vibration sensor or an seismic sensor and comprises an accelerometer, a geophone, or a combination thereof.

33. The method or the system according to any one of paragraphs 1-32, wherein the plurality of stages downhole in the casing comprises about 5 stages to about 80 stages.

34. The method or the system according to any one of paragraphs 1-33, wherein the plurality of stages downhole in the casing comprises about 20 stages to about 60 stages.

35. The method or the system according to any one of paragraphs 1-34, wherein the plurality of stages downhole in the casing comprises about 40 stages to about 50 stages.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method for characterizing fractures in a subterranean formation containing a wellbore extending from a ground surface, comprising:
   prior to detonating an encapsulated explosive unit, fracturing the subterranean formation to produce the fractures, increasing a length of the fractures, increasing a complexity or connectivity of the fractures, or combinations thereof;
   introducing the encapsulated explosive unit into a casing located in the wellbore;
   maintaining the encapsulated explosive unit in a first stage of the casing while passing a fluid through the casing, the first stage is located between the ground surface and a first bridge plug positioned downhole in the casing, and the fluid passes through a first group of perforations formed through the casing in the first stage;
   detonating the encapsulated explosive unit within the first stage to generate a pressure wave that passes through the first group of perforations and further passes into the fractures contained in the subterranean formation;
   measuring a reflected pressure wave passing in the first stage using a pressure sensor coupled to the first bridge plug to produce a pressure measurement, wherein the pressure wave is reflected from the fractures to produce the reflected pressure wave;
   converting the pressure measurement into an acoustic signal correlated with the pressure measurement by using an acoustic signal generator contained in the first bridge plug; and
   transmitting the acoustic signal to apply acoustic pressure on a fiber optic cable coupled to an exterior surface of the casing.

2. The method of claim 1, wherein prior to or subsequent to introducing the encapsulated explosive unit into the casing, the method further comprises determining fracture initiation points of the subterranean formation adjacent the first stage by distributed temperature sensing using a fiber optic sensing system comprising the fiber optic cable.

3. The method of claim 1, wherein prior to introducing the encapsulated explosive unit into the casing, the method further comprises determining fluid allocations for the subterranean formation adjacent the first stage by distributed acoustic sensing using a fiber optic sensing system comprising the fiber optic cable.

4. The method of claim 1, wherein the acoustic signal is indicative to the length of the fractures, the complexity of the fractures, the connectivity of the fractures, or combinations thereof.

5. The method of claim 4, further comprising introducing a diverter agent into the fractures.

6. The method of claim 1, wherein the encapsulated explosive unit is maintained in the first stage of the casing by having a size of the encapsulated explosive unit too large to allow the encapsulated explosive unit passage through the perforations in the first stage.

7. The method of claim 1, wherein the encapsulated explosive unit has a diameter of 1 inch to 5 inches.

8. The method of claim 1, wherein the encapsulated explosive unit comprises an explosive material at least partially encapsulated by a polymeric coating.

9. The method of claim 1, wherein detonating the encapsulated explosive unit within the first stage comprises dissolving or degrading a protective coating from an explosive material contained within the encapsulated explosive unit.

10. The method of claim 9, further comprising introducing a chemical agent into the first stage to dissolve or degrade the protective coating from the explosive material.

11. The method of claim 9, further comprising controlling at least one of temperature, pH, chemical agent concentration, or combinations thereof to dissolve or degrade the protective coating from the explosive material.

12. The method of claim 1, wherein detonating the encapsulated explosive unit within the first stage comprises applying a force to the encapsulated explosive unit, the force is selected from the group consisting of a pressure force, an electromagnetic force, and combinations thereof.

13. The method of claim 1, wherein the encapsulated explosive unit is introduced into the casing from an explosive unit distributer containing a plurality of the encapsulated explosive units.

14. The method of claim 13, further comprising generating a plurality of the pressure waves from the plurality of the encapsulated explosive units, wherein each of the pressure waves is separated by a period of time and is generated from detonating the encapsulated explosive units one at a time.

15. The method of claim 1, wherein subsequent to transmitting the acoustic signal, the method further comprises:
introducing an additional encapsulated explosive unit into the casing;
maintaining the additional encapsulated explosive unit in the first stage while passing the fluid through the first group of perforations;
detonating the additional encapsulated explosive unit within the first stage;
detecting an additional pressure measurement with the pressure sensor;
converting the additional pressure measurement into an additional acoustic signal; and
transmitting the additional acoustic signal to apply additional acoustic pressure on the fiber optic cable.

16. The method of claim 1, wherein subsequent to transmitting the acoustic signal, the method further comprises:
positioning a second bridge plug downhole in the casing, the first stage is located between the first and second bridge plugs and a second stage is located between the ground surface and the second bridge plug; and
forming a second group of perforations through the casing in the second stage, the second group of perforations is in fluid communication with a second group of fractures contained in the subterranean formation.

17. The method of claim 16, further comprising:
introducing a second encapsulated explosive unit into the second stage;
detonating the encapsulated explosive unit within the second stage to generate a second pressure wave that passes through the second group of perforations and further passes into the second group of fractures;
detecting a second pressure measurement with a second pressure sensor coupled to the second bridge plug;
converting the second pressure measurement into a second acoustic signal correlated with the second pressure measurement by a second acoustic signal generator contained in the second bridge plug; and
transmitting the second acoustic signal to apply acoustic pressure on the fiber optic cable.

18. The method of claim 1, further comprising measuring a seismic signal using a seismic sensor coupled to the first bridge plug.

19. The method of claim 18, wherein the seismic signal is generated from at least one of detonating the encapsulated explosive unit or another explosive, performing a fracturing operation, a vibrator unit, or combinations thereof.

20. A method for characterizing fractures in a subterranean formation containing a casing located in a wellbore extending from a ground surface, comprising:
positioning a bridge plug downhole in the casing;
prior to generating a pressure wave, fracturing the subterranean formation to produce the fractures, increasing a length of the fractures, increasing a complexity or connectivity of the fractures, or combinations thereof;
generating a pressure wave by an explosion or a fluid hammer system;
passing the pressure wave through a group of perforations formed through the casing and into the fractures contained in the subterranean formation;
measuring a reflected pressure wave passing in a stage of the casing using a pressure sensor coupled to the bridge plug to produce a pressure measurement, wherein the stage is uphole of the bridge plug, wherein the pressure wave is reflected from the fractures to produce the reflected pressure wave;
converting the pressure measurement into an acoustic signal correlated with the pressure measurement by using an acoustic signal generator contained in the bridge plug; and
transmitting the acoustic signal to apply acoustic pressure on a fiber optic cable coupled to an exterior surface of the casing.

21. The method of claim 20, wherein the fluid hammer system is operable to generate the pressure wave by suddenly closing a valve with a pressurized and flowing fluid.

22. The method of claim 20, wherein the pressure wave is generated by the fluid hammer system, and wherein the fluid hammer system comprises a water-powered hammer, a mud-powered hammer, a water-powered drill, a mud-powered drill, or any combination thereof.

23. The method of claim 20, wherein the pressure wave is generated by the explosion, and further comprising detonating an encapsulated explosive unit within the stage to generate the pressure wave.

24. The method of claim 23, further comprising:
introducing the encapsulated explosive unit into the casing from the ground surface; and
maintaining the encapsulated explosive unit in the stage by having a size of the encapsulated explosive unit too large to allow the encapsulated explosive unit passage through the perforations in the stage.

25. A method for characterizing fractures in a subterranean formation containing a casing located in a wellbore extending from a ground surface, comprising:
forming a plurality of stages downhole in the casing;
wherein forming each stage comprises:
positioning a bridge plug into the casing,
forming a group of perforations through the casing adjacent to the bridge plug,
generating a pressure wave by an explosion or a fluid hammer system,
passing the pressure wave through the perforations and into the fractures contained in the subterranean formation adjacent the bridge plug, measuring a reflected pressure wave passing in the stage using a pressure sensor coupled to the bridge plug to produce a pressure measurement, wherein the pressure wave is reflected from the fractures to produce the reflected pressure wave, converting the pressure measurement into an acoustic signal correlated with the pressure measurement by an acoustic signal generator contained in the bridge plug, and transmitting the acoustic signal to apply acoustic pressure on a fiber optic cable coupled to an exterior surface of the casing; and wherein prior to or during the generation of each pressure wave, the method further comprises at least one of:

determining fracture initiation points of the subterranean formation adjacent each stage by distributed temperature sensing using a fiber optic sensing system comprising the fiber optic cable, determining fluid allocations for the subterranean formation adjacent each stage by distributed acoustic sensing using the fiber optic sensing system, or a combination thereof.

26. The method of claim 25, wherein the plurality of stages downhole in the casing comprises 5 stages to 80 stages.

27. The method of claim 25, wherein generating the pressure wave comprises generating the pressure wave using the fluid hammer system by suddenly closing a valve with a pressurized and flowing fluid.

28. A method for characterizing fractures in a subterranean formation containing a casing located in a wellbore extending from a ground surface, comprising:

positioning a bridge plug downhole in the casing;

generating a pressure wave by a fluid hammer system, the generated pressure wave being transmitted to a stage of the casing, the stage being uphole of the bridge plug;

passing the pressure wave through a group of perforations formed through the casing and into the fractures contained in the subterranean formation;

measuring a reflected pressure wave passing in the stage using a pressure sensor coupled to the bridge plug to produce a pressure measurement, wherein the pressure wave is reflected from the fractures to produce the reflected pressure wave;

converting the pressure measurement into an acoustic signal correlated with the pressure measurement by using an acoustic signal generator contained in the bridge plug; and transmitting the acoustic signal to apply acoustic pressure on a fiber optic cable coupled to an exterior surface of the casing;

wherein prior to or during the generation of the pressure wave, the method further comprises at least one of:

determining fracture initiation points of the subterranean formation adjacent each stage by distributed temperature sensing using a fiber optic sensing system comprising the fiber optic cable, determining fluid allocations for the subterranean formation adjacent each stage by distributed acoustic sensing using the fiber optic sensing system, or a combination thereof.

* * * * *